(12) United States Patent
Takata

(10) Patent No.: US 9,056,637 B2
(45) Date of Patent: Jun. 16, 2015

(54) CARGO BED AND VEHICLE

(71) Applicant: YAMAHA HATSUDOKI KABUSHIKI KAISHA, Iwata-shi, Shizuoka (JP)

(72) Inventor: Kazunari Takata, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/178,830

(22) Filed: Feb. 12, 2014

(65) Prior Publication Data

US 2014/0225395 A1     Aug. 14, 2014

Related U.S. Application Data

(60) Provisional application No. 61/764,678, filed on Feb. 14, 2013.

(51) Int. Cl.
    *B62D 33/02*     (2006.01)
    *B62D 25/16*     (2006.01)
    *B62D 23/00*     (2006.01)

(52) U.S. Cl.
    CPC .............. *B62D 33/02* (2013.01); *B62D 23/005* (2013.01); *B62D 25/168* (2013.01)

(58) Field of Classification Search
    CPC ............................. B62D 33/02; B62D 33/023
    USPC .............................. 296/183.1, 198, 39.1, 39.2
    See application file for complete search history.

(56) References Cited

U.S. PATENT DOCUMENTS

| | | | |
|---|---|---|---|
| 4,998,769 A * | 3/1991 | Johnson et al. | 296/183.1 |
| 5,873,688 A | 2/1999 | Wheatley | |
| 2004/0134953 A1 | 7/2004 | Perez | |
| 2004/0262950 A1 * | 12/2004 | Bhat et al. | 296/183.1 |
| 2005/0236867 A1 * | 10/2005 | McNulty et al. | 296/183.1 |
| 2007/0046056 A1 | 3/2007 | Delaney et al. | |
| 2008/0231064 A1 | 9/2008 | Plavetich | |
| 2011/0042990 A1 | 2/2011 | Holt | |

* cited by examiner

*Primary Examiner* — Dennis H Pedder
(74) *Attorney, Agent, or Firm* — Keating & Bennett, LLP

(57) ABSTRACT

A cargo bed includes a main body portion made of a material including a metal, and a pair of rear fenders made of a material including a resin and fixed to the main body portion. The main body portion includes a front wall portion extending in an up-down direction and a left-right direction, a bottom portion extending rearward from a lower edge region of the front wall portion, and a pair of side wall portions extending upward from two edge regions in the left-right direction of the bottom portion, and connected to two edge regions in the left-right direction of the front wall portion. The pair of rear fenders are fixed to the pair of side wall portions, respectively. Each of the pair of side wall portions includes a main side wall extending upward from the bottom portion, a first flange portion extending in the left-right direction, from an upper edge of the main side wall to an outside of the main body portion, and a second flange portion extending downward from an outside edge of the first flange portion. Each rear fender covers at least an entire lower edge of the second flange portion.

10 Claims, 33 Drawing Sheets

CARGO BED AND VEHICLE

BACKGROUND OF THE INVENTION

1. Field of the Invention

The present invention relates to a cargo bed and a vehicle, and more specifically to a cargo bed including a rear fender, and to a vehicle including the same.

2. Description of the Related Art

Conventionally, there is proposed a variety of off-road vehicles (e.g., Recreational Off-Highway Vehicles (ROVs)). Generally in this type of vehicles, there is provided a cargo bed above a pair of rear wheels for hauling cargo.

Referring to FIG. 28, a cargo bed 1 includes a main body portion 2, a pair of rear fenders 3a, 3b, and a tail gate 4. Referring to FIG. 29, the main body portion 2 is made of a metal material, for example, and includes a bottom portion 2a, a pair of side wall portions 2b, 2c and a front wall portion 2d. The pair of rear fenders 3a, 3b are made of a resin material for example, and are attached to the pair of side wall portions 2b, 2c. The tail gate 4 is made of materials which include a metal and a resin, for example, and is openable/closeable, being attached to a rearward end region of the bottom portion 2a.

Referring to FIG. 30 and FIG. 31, the side wall portion 2b has a substantially L-shaped section. Specifically, the side wall portion 2b has a main side wall portion 5a which extends upward from a left edge of the bottom portion 2a (see FIG. 29), and a flange portion 5b which extends leftward from an upper edge of the main side wall portion 5a. The rear fender 3a is attached to the flange portion 5b so as to cover an upper surface of the flange portion 5b. The rear fender 3a is fixed to the flange portion 5b with a plurality of rivets 5c, for example. Though not explained in further detail, the side wall portion 2c has the same arrangement as the side wall portion 2b whereas the rear fender 3b has the same arrangement as the rear fender 3a.

With these arrangements, the cargo bed sometimes has an attachment of various types which is attached thereto for a purpose of enhanced convenience of the cargo bed. For example, in the cargo bed 1 described thus far, an attachment 6 is provided on an upper surface of the rear fender 3a as shown in FIG. 32. Then, a fastener 7, for example, is inserted from above the attachment 6 through the attachment 6, the rear fender 3a and the flange portion 5b. The attachment 6 is thus fixed to the cargo bed 1.

In this case, however, the rear fender 3a which is made of a resin is located between the attachment 6 and the flange portion 5b, so it is difficult to fix the attachment 6 strongly to the cargo bed 1.

One idea to overcome this would be to cut off part of the rear fender 3a as shown in FIG. 33, so as to expose an upper surface of the flange portion 5b. In this case, it is possible to fix the attachment 6 directly to the flange portion 5b, so it is possible to fix the attachment 6 strongly to the cargo bed 1. However, cutting off part of the rear fender 3a so as to expose the upper surface of the flange portion 5b can lead to a problem that there will be a gap 8 between an edge region of the flange portion 5b and the rear fender 3a. In this case, the gap 8 can cause a nuisance such that muddy water, etc. splashed by a rear wheel (not illustrated) will find a way to come out of the rear fender 3a, resulting in dirty outer surfaces of the rear fender 3a.

SUMMARY OF THE INVENTION

Therefore, preferred embodiments of the present invention provide a cargo bed to which an attachment can be fixed strongly and in which dirtiness of the rear fenders is significantly reduced or prevented, and provide a vehicle which includes the cargo bed.

According to a preferred embodiment of the present invention, a cargo bed includes a main body portion made of a material including a metal; and a pair of rear fenders made of a material including a resin and fixed to the main body portion. In this cargo bed, the main body portion includes a front wall portion extending in an up-down direction and a left-right direction; a bottom portion extending rearward from a lower edge region of the front wall portion; and a pair of side wall portions extending upward from two edge regions in the left-right direction of the bottom portion, and connected to two edge regions in the left-right direction of the front wall portion. The pair of rear fenders are fixed to the pair of side wall portions respectively. Each of the pair of side wall portions includes a main side wall extending upward from the bottom portion; a first flange portion extending in the left-right direction from an upper edge of the main side wall to an outside of the main body portion; and a second flange portion extending downward from an outside edge of the first flange portion. With this arrangement, each rear fender covers at least an entire lower edge of the second flange portion.

According to a cargo bed of a preferred embodiment of the present invention, the rear fender may cover the entire upper surface of the first flange portion, for example. In this case, a portion of the rear fender will be cut out to expose the first flange portion, so that an attachment can be fixed directly to the exposed region of the first flange portion. This makes it possible to fix the attachment strongly to the cargo bed. In the case where the rear fender is arranged to cover the entire upper surface of the first flange portion, the rear fender may include a perforation or perforations, for example, for cutting out a predetermined region.

Also, according to the cargo bed of a preferred embodiment of the present invention, the second flange portion extends downward from the outer edge of the first flange portion, and the lower edge of the second flange portion is covered by the rear fender. Therefore, even if a portion of the rear fender is cut out in order to expose the first flange portion as described above, for example, the arrangement prevents a gap from being formed between the side wall portion (more specifically, the lower edge of the second flange portion) and the rear fender. Consequently, it is possible to prevent muddy water, etc. splashed by the rear wheel of the vehicle from finding a way to come out from between the main body portion and the rear fender. As a result, it is possible to significantly reduce or prevent dirtiness on outer surfaces of the rear fender.

Preferably, each rear fender fixed to the side wall portion makes at least a portion of the first flange portion exposable. In this case, by exposing the first flange portion, the arrangement makes it possible to fix the attachment directly to the first flange portion.

Further preferably, each rear fender exposes at least a portion of the second flange portion. In this case, an attachment can also be fixed directly to the second flange portion. This improves versatility of the cargo bed.

Further, preferably, each second flange portion includes a first region extending downward from an outer edge of the first flange portion; and a second region extending obliquely downward from a lower edge of the first region toward an outside of the main body portion in the left-right direction. In this case, the second flange portion includes the second region which extends obliquely downward from a lower edge of the first region, such that it is possible to improve stiffness of the second flange portion. Since the second region is slanted obliquely downward, it is possible to form holes in the second region for fasteners by using a landed plunger mold, for example. In other words, it is possible to form the holes in the second region with a simple mold.

Preferably, each rear fender is fixed to the second region. In this case, since the outer surface of the second region faces obliquely upward, it is easy to attach fasteners to fix the rear fender to the second region. Also, in addition to the first flange portion, the first region of the second flange portion can be used to fix the attachment. This improves versatility of the cargo bed.

Further preferably, the main side wall and the second flange portion are spaced by a gap of approximately one inch, for example. In this case, a one-inch square piece of wood, which is easily available in the United States of America, can be fitted between the main side wall and the second flange portion. This provides easy improvement in the stiffness of the side wall portion.

Further, preferably, each rear fender covers a forward end region of the first flange portion, a rearward end region of the first flange portion, a forward end region of the second flange portion, and a rearward end region of the second flange portion. In this case, the rear fender provides protection to the forward end region and the rearward end region of the first flange portion, and the forward end region and the rearward end region of the second flange portion.

The cargo bed described thus far is suitably applicable to vehicles.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
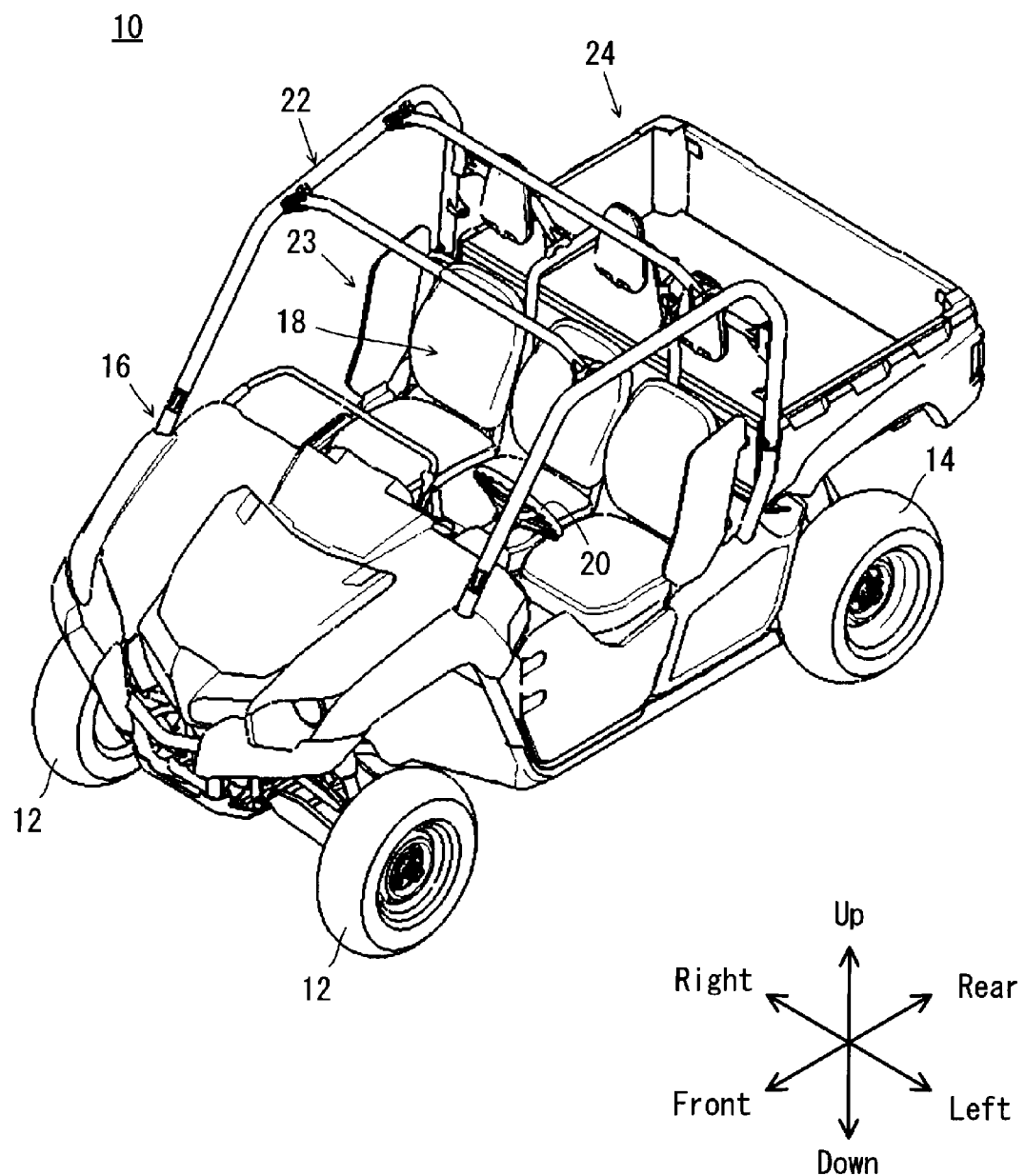
FIG. 1 is a perspective view of a vehicle according to a preferred embodiment of the present invention.

Hereinafter, preferred embodiments of the present invention will be described with reference to the drawings. It is noted that the terms front and rear, right and left, up and down as used to describe various preferred embodiments of the present invention are determined from the driver's position on a seat 18a of a vehicle 10, with the driver facing toward a steering wheel 20.

Referring to FIG. 1 through FIG. 5, the vehicle 10 according to a preferred embodiment of the present invention preferably is a four-wheel-drive recreational off-highway vehicle (ROV), and includes a pair of front wheels 12, a pair of rear wheels 14, a frame portion 16, a seat unit 18, a steering wheel 20, a roll-over protection cage 22, a shoulder bolster portion 23 and a cargo bed 24. The frame portion 16 is supported by the pair of front wheels 12 and the pair of rear wheels 14. Referring to FIG. 6, the frame portion 16 includes a main frame portion 16a supported by the pair of front wheels 12 (see FIG. 1) and the pair of rear wheels 14 (see FIG. 1); and a seat frame portion 16b supported by the main frame portion 16a. The seat unit 18 is supported by the seat frame portion 16b.

Figure 7:
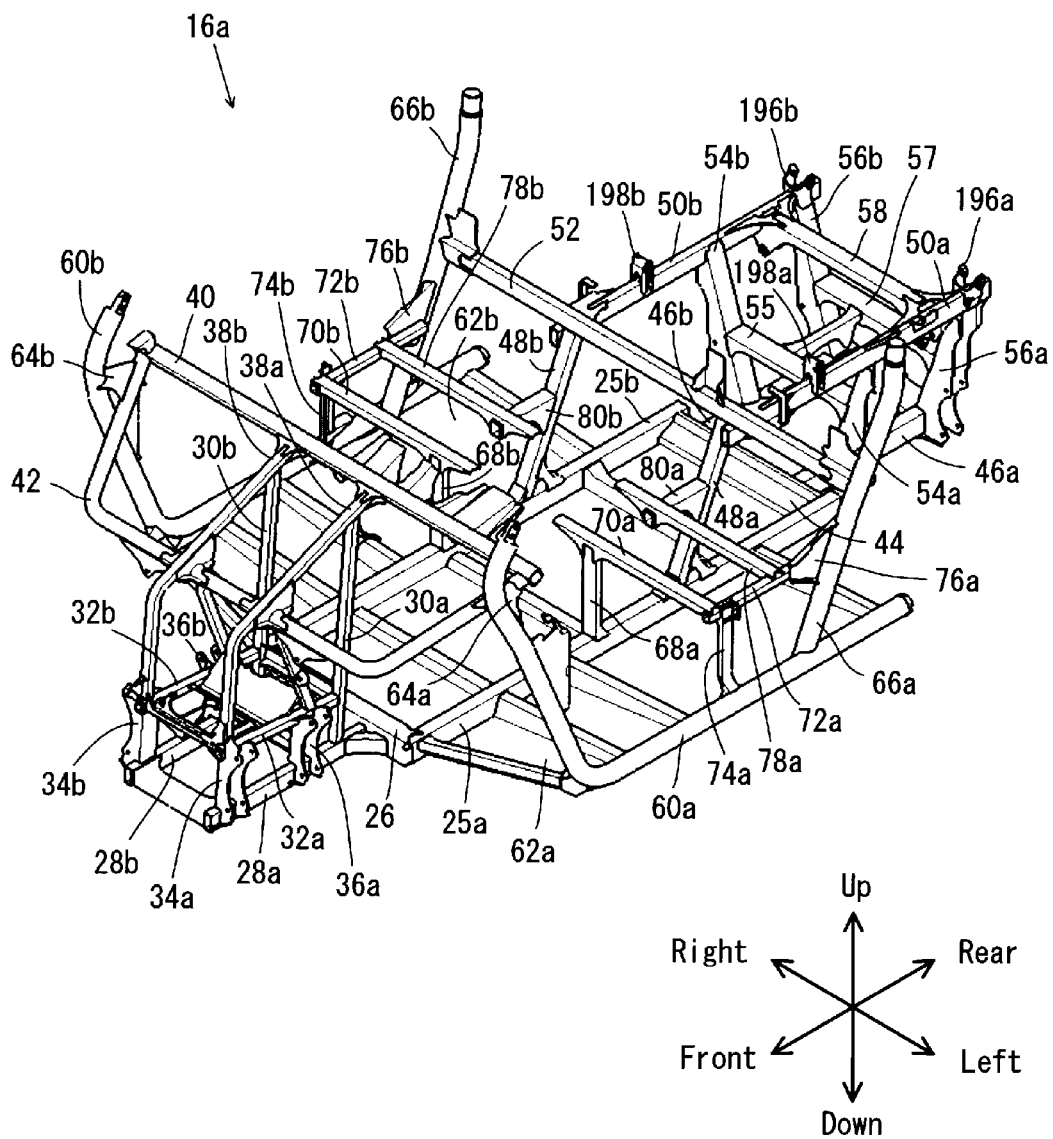
FIG. 7 is a perspective view of a main frame portion.

Referring to FIG. 7, the main frame portion 16a includes a pair of side frame portions 25a, 25b extending in a fore-aft direction. The side frame portion 25a and the side frame portion 25b are parallel or substantially parallel to each other.

The side frame portion 25a and the side frame portion 25b have their respective forward ends connected to each other by a cross member 26 extending in a left-right direction (a width direction of the vehicle 10).

From the cross member 26, a pair of side frame portions 28a, 28b extend forward. In the width direction of the vehicle 10, the side frame portions 28a, 28b are located father inward than the side frame portions 25a, 25b. The side frame portion 28a and the side frame portion 28b are parallel or substantially parallel to each other. A pair of support frame portions 30a, 30b extend upward from respective rearward regions of the side frame portions 28a, 28b.

Above the side frame portions 28a, 28b, a pair of side frame portions 32a, 32b extend forward from the support frame portions 30a, 30b. The side frame portion 32a and the side frame portion 32b are parallel or substantially parallel to each other.

The side frame portions 28a, 28b have their forward end regions connected to respective forward end regions of the side frame portions 32a, 32b by a pair of support frame portions 34a, 34b extending in an up-down direction. The side frame portions 28a, 28b have their rearward regions connected to respective rearward regions of the side frame portions 32a, 32b by a pair of support frame portions 36a, 36b extending in an up-down direction. The support frame portions 36a, 36b are at a more rearward position than the support frame portions 34a, 34b.

The side frame portions 32a, 32b have their forward end regions connected to a pair of support frame portions 38a, 38b. The support frame portions 38a, 38b extend upward from the side frame portions 32a, 32b, and then obliquely in a rearward and upward direction. The support frame portions 30a, 30b have their upper ends connected to respective rearward end regions of the support frame portions 38a, 38b. The support frame portions 38a, 38b have their rear ends connected to a cross member 40 extending in a left-right direction.

From the cross member 40, a U-shaped or substantially U-shaped frame portion 42 extends forward, below the support frame portions 38a, 38b. The U-shaped or substantially U-shaped frame portion 42 has two end regions connected to respective end regions of the cross member 40. The U-shaped or substantially U-shaped frame portion 42 has an intermediate portion connected to the support frame portions 38a, 38b.

The side frame portion 25a and the side frame portion 25b have their respective rearward end regions connected to each other by a cross member 44 extending in a left-right direction. From the cross member 44, a pair of side frame portions 46a, 46b extend rearward. In the width direction of the vehicle 10, the side frame portions 46a, 46b are located farther inward than the side frame portions 25a, 25b. The side frame portion 46a and the side frame portion 46b are parallel or substantially parallel to each other.

At a more forward position than the cross member 44, a pair of support frame portions 48a, 48b extend obliquely in an upward and rearward direction from the pair of side frame portions 25a, 25b. At a higher position than the side frame portions 46a, 46b, a pair of side frame portions 50a, 50b extend in a fore-aft direction. The side frame portion 50a and the side frame portion 50b are parallel or substantially parallel to each other. In the width direction of the vehicle 10, the side frame portions 50a, 50b are located farther outward than the side frame portions 46a, 46b. The side frame portions 50a, 50b have their forward end regions connected to respective upper end regions of the support frame portions 48a, 48b. The support frame portions 48a, 48b have their upper ends connected to a cross member 52 extending in a left-right direction.

Referring to FIG. 6 and FIG. 7, the side frame portions 46a, 46b and the side frame portions 50a, 50b are connected to each other by a pair of support frame portions 54a, 54b which extend in an up-down direction and a pair of support frame portions 56a, 56b which extend in an up-down direction. The support frame portions 54a, 54b are at a more forward position than the support frame portions 56a, 56b. The support frame portion 54a and the support frame portion 54b are connected to each other by a cross member 55 extending in a left-right direction. The support frame portion 56a and the support frame portion 56b are connected to each other by a cross member 57 extending in a left-right direction. The side frame portion 50a and the side frame portion 50b are connected to each other by a cross member 58 extending in a left-right direction. The cross member 58 is at a position which is more rearward than the support frame portions 54a, 54b and more forward than the support frame portions 56a, 56b.

In the width direction of the vehicle 10, there is provided a pair of L-shaped or substantially L-shaped support frame portions 60a, 60b on respective outer sides of the side frame portions 25a, 25b. The support frame portion 60a is connected to the side frame portion 25a via a plate frame portion 62a, whereas the support frame portion 60b is connected to the side frame portion 25b via a plate frame portion 62b.

Referring to FIG. 7, the support frame portions 60a, 60b have their upper regions connected to two end regions of the U-shaped or substantially U-shaped frame portion 42 via connecting members 64a, 64b. A pair of support frame portions 66a, 66b extend obliquely in an upward and rearward direction from rearward regions of the support frame portions 60a, 60b. The support frame portions 66a, 66b have their substantially intermediate regions connected to two end regions of the cross member 52.

A pair of support frame portions 68a, 68b extend upward from substantially intermediate regions of the side frame portions 25a, 25b. A pair of support frame portions 70a, 70b extend in a left-right direction, being supported by upper ends of the support frame portions 68a, 68b. The support frame portion 70a has an end region (left end region in the present preferred embodiment) connected to a forward end region of a support frame portion 72a which extends in a fore-aft direction, whereas the support frame portion 70b has an end region (right end region in the present embodiment) connected to a forward end region of a support frame portion 72b which extends in a fore-aft direction.

The support frame portion 72a has a forward region connected to the support frame portion 60a by a support frame portion 74a which extends in an up-down direction, whereas the support frame portion 72b has a forward region connected to the support frame portion 60b by a support frame portion 74b which extends in an up-down direction. The support frame portion 72a has a rearward region connected to the support frame portion 66a via a connecting member 76a, whereas the support frame portion 72b has a rearward region connected to the support frame portion 66b via a connecting member 76b.

Behind the support frame portion 70a, a support frame portion 78a is arranged parallel or substantially parallel to the support frame portion 70a, whereas behind the support frame portion 70b, a support frame portion 78b is arranged parallel or substantially parallel to the support frame portion 70b. The support frame portion 78a has an end region (left end region in the present embodiment) connected to the support frame portion 72a, whereas the support frame portion 78b has an end region (right end region in the present preferred embodiment) connected to the support frame portion 72b.

A pair of support frame portions 80a, 80b extend forward from substantially intermediate regions of the support frame portions 48a, 48b. The support frame portions 80a, 80b have their forward end regions connected to the support frame portions 78a, 78b.

Referring to FIG. 6 and FIG. 7, the seat unit 18 is supported by the support frame portions 70a, 70b, 78a, 78b of the main frame portion 16a via the seat frame portion 16b. The seat unit 18 includes seats 18a, 18b and 18c, and headrest portions 19a, 19b and 10c (see FIG. 3 through FIG. 5). Referring to FIG. 1, the steering wheel 20 is in front of the seat 18a of the seat unit 18. The seat unit 18 and the steering wheel 20 are within the roll-over protection cage 22. The roll-over protection cage 22 is supported by the frame portion 16.

Figure 8:
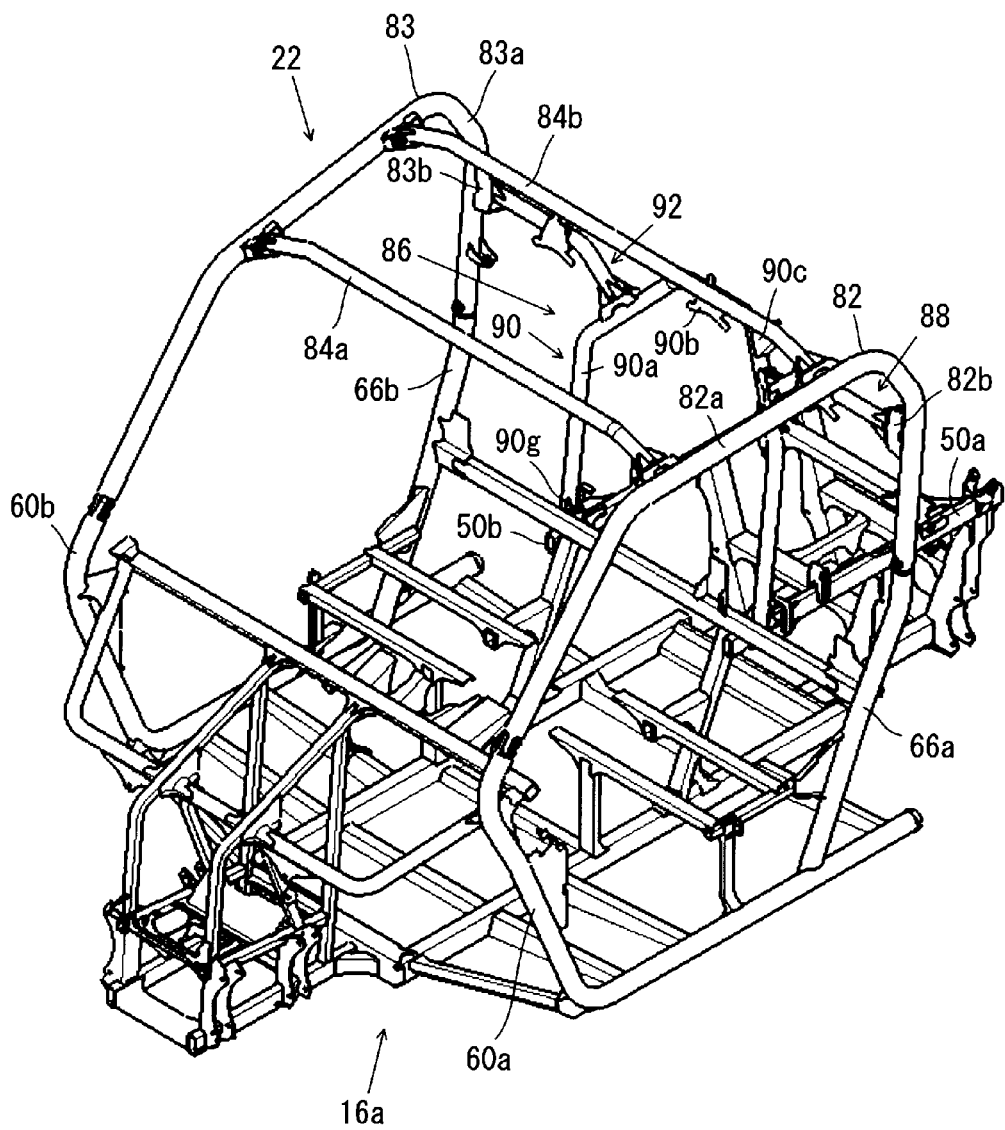
FIG. 8 is a perspective view of the main frame portion and the roll-over protection cage.

Referring to FIG. 8, the roll-over protection cage 22 includes a pair of side cage members 82, 83 extending in a fore-aft direction; a pair of roof members 84a, 84b extending in a left-right direction; and a cross member portion 86 extending in a left-right direction.

The side cage member 82 includes a main body portion 82a which has a shape of an inverted letter of U or a shape substantially of an inverted letter of U, in a side view; and a connecting portion 82b at a rearward region of the main body portion 82a. The connecting portion 82b protrudes inward (rightward in the present preferred embodiment) from the main body portion 82a in the width direction of the vehicle 10. The side cage member 83 includes a main body portion 83a which has a shape of an inverted letter of U or a shape substantially of an inverted letter of U, in a side view; and a connecting portion 83b at a rearward region of the main body portion 83a. The connecting portion 83b protrudes inward (leftward in the present preferred embodiment) from the main body portion 83a in the width direction of the vehicle 10.

The main body portions 82a, 83a are supported by the frame portion 16. More specifically, the main body portion 82a has an end region (forward end region in the present preferred embodiment), which is connected to an upper end region of the support frame portion 60a; and the main body portion 82a has another end region (rearward end region in the present embodiment), which is connected to an upper end region of the support frame portion 66a. The main body portion 82a is fixed to the support frame portions 60a, 66a with, e.g., fasteners (such as bolts and nuts). Likewise, the main body portion 83a has an end region (forward end region in the present preferred embodiment), which is connected to an upper end region of the support frame portion 60b; and the main body portion 83a has another end region (rearward end region in the present preferred embodiment), which is connected to an upper end region of the support frame portion 66b. The main body portion 83a is fixed to the support frame portions 60b, 66b with, e.g., fasteners (such as bolts and nuts).

The roof members 84a, 84b connect an upper region of the side cage member 82 to an upper region of the side cage member 83. The roof member 84b is at a more rearward position than the roof member 84a. The roof member 84b is at a higher position than the seat unit 18.

Figure 3:
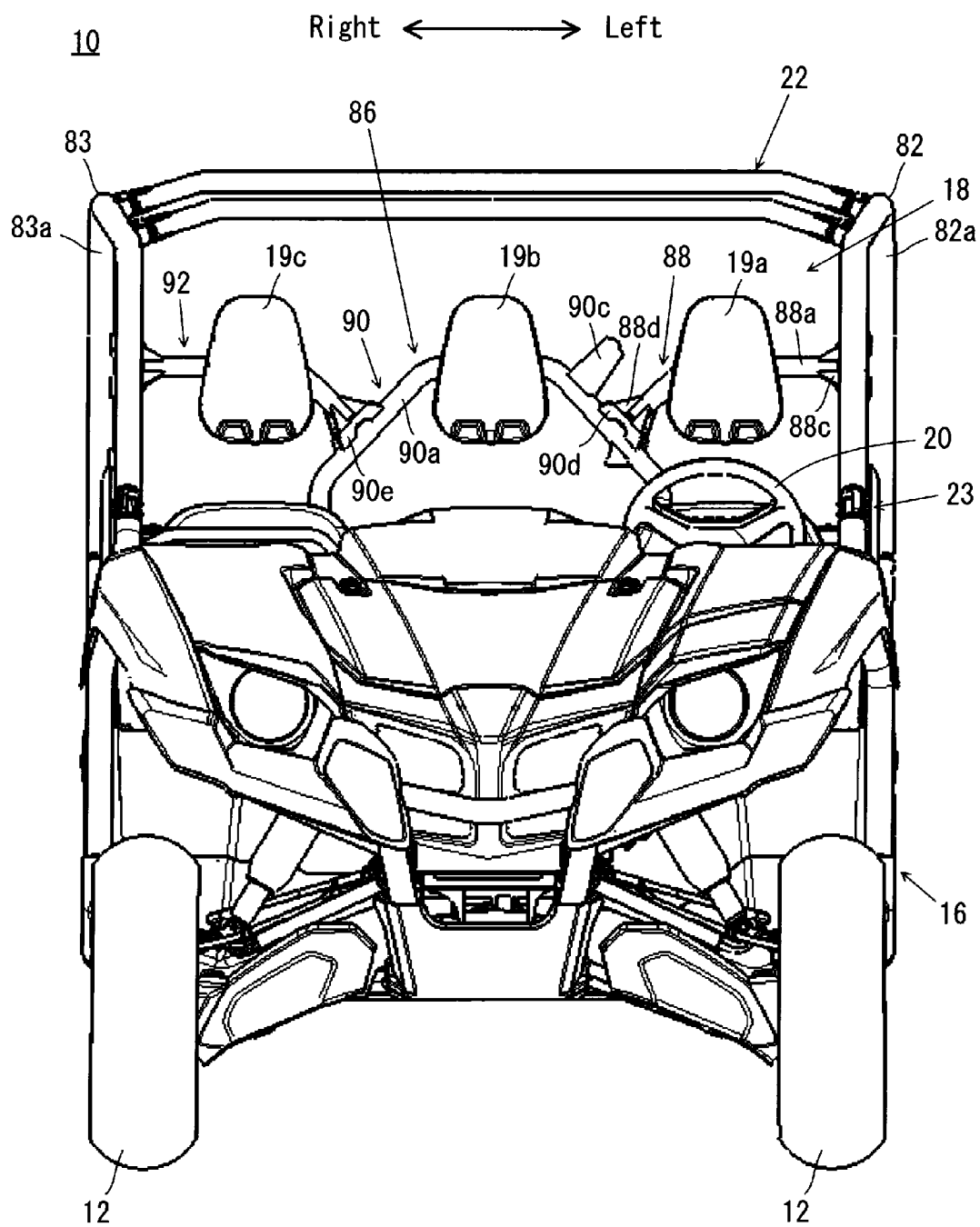
FIG. 3 is a front view of the vehicle.
Figure 4:
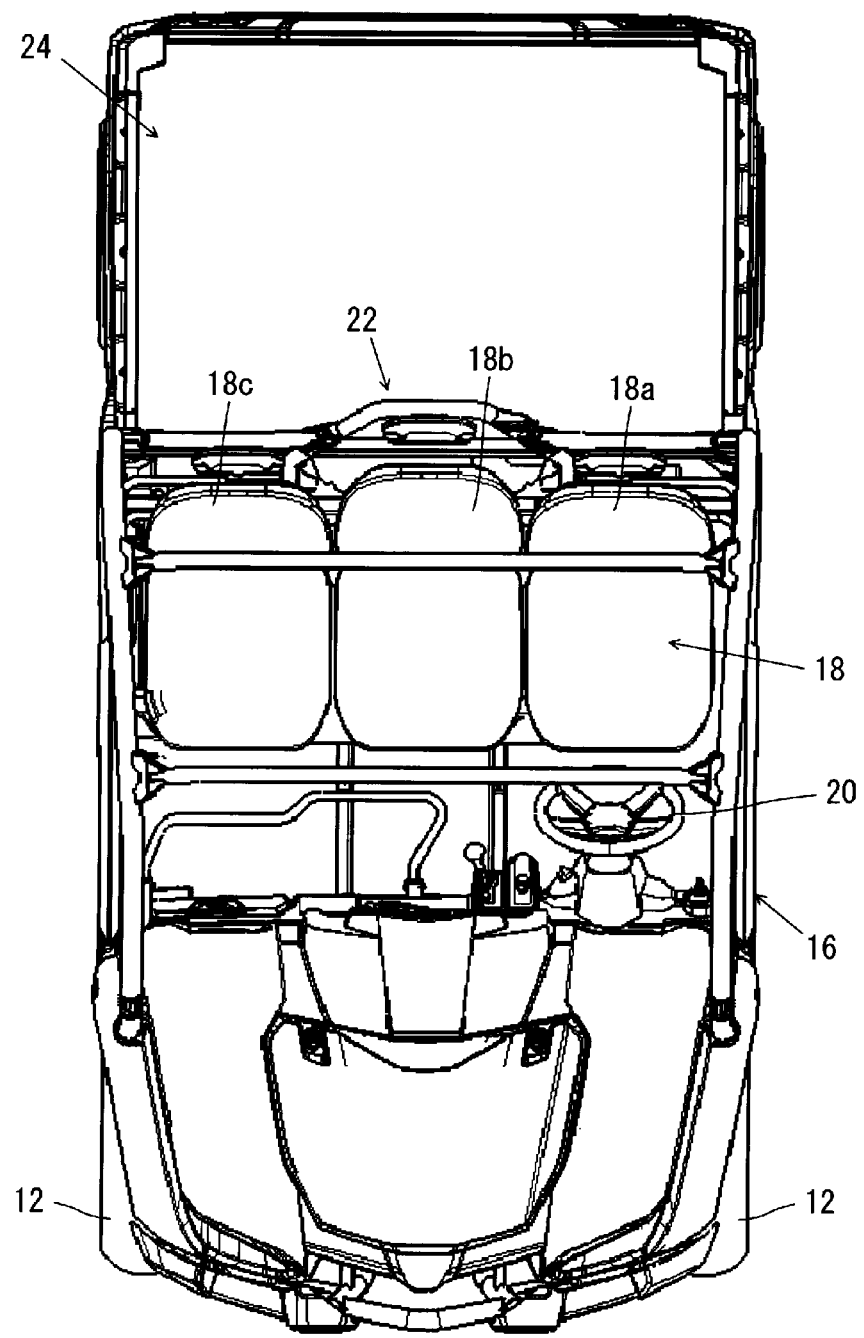
FIG. 4 is a plan view of the vehicle.
Figure 5:
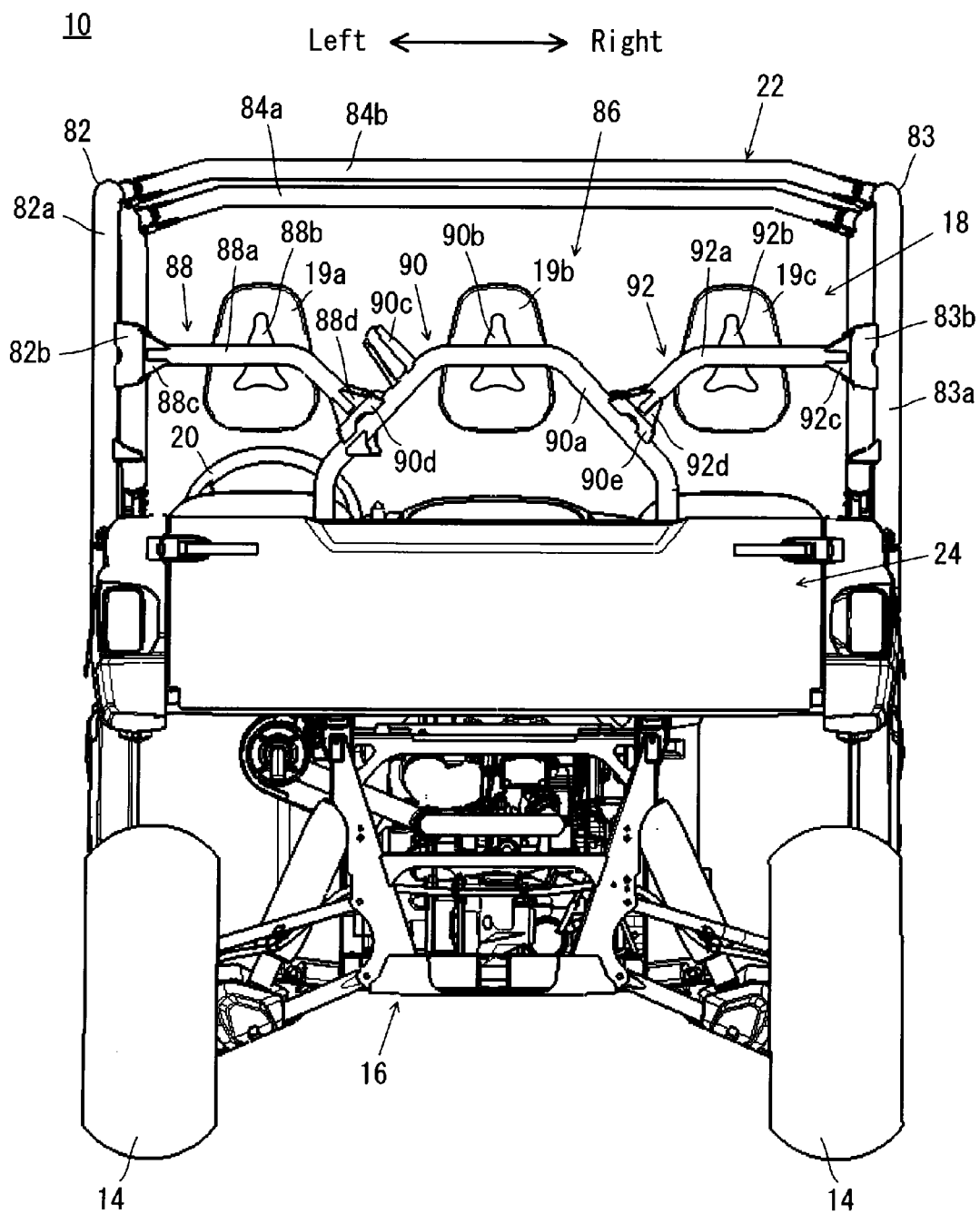
FIG. 5 is a rear view of the vehicle.
Figure 6:
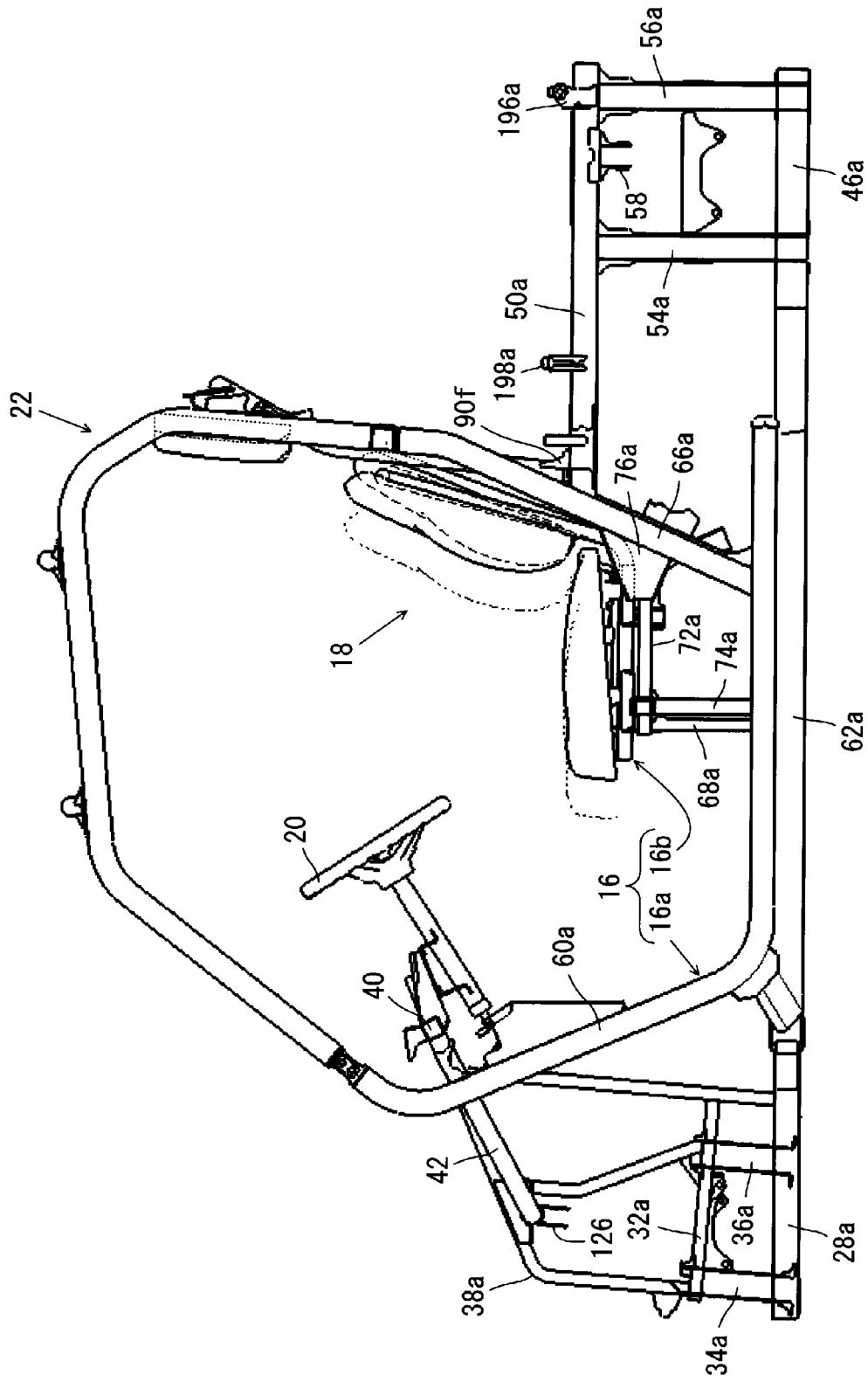
FIG. 6 is a side view showing a frame portion, a seat unit, a steering wheel and a roll-over protection cage.

Referring to FIG. 3, FIG. 5 and FIG. 8, the cross member portion 86 includes a support member 88, a support member 90 and a support member 92. The support member 90 is at an intermediate portion in the width direction of the vehicle 10, the support member 88 connects the support member 90 and the side cage member 82 to each other, and the support member 92 connects the support member 90 and the side cage member 83 to each other.

Referring to FIG. 5, the support member 88 includes a main body portion 88a extending in a left-right direction; a mounting portion 88b fixed to an intermediate region of the main body portion 88a; a connecting portion 88c fixed to an end region (left end region in the present embodiment) of the main body portion 88a; and a connecting portion 88d fixed to another end region (right end region in the present embodiment) of the main body portion 88a. The headrest portion 19a of the seat unit 18 is attached to the mounting portion 88b. The connecting portion 88c is connected detachably from/attachably to the connecting portion 82b of the side cage member 82. Specifically, the connecting portion 88c is connected to the connecting portion 82b of the side cage member 82 with unillustrated fasteners (such as bolts and nuts) for example. The connecting portion 88d is connected to a connecting portion 90d, which will be described later, of the support member 90 with unillustrated fasteners (such as bolts and nuts).

Referring to FIG. 5 and FIG. 8, the support member 90 includes a main body portion 90a which has a shape of an inverted letter of U or a shape substantially of an inverted letter of U, in a front view; a mounting portion 90b placed at an upper end region, i.e., an intermediate region, of the main body portion 90a; and a mounting portion 90c which extends obliquely upward from the main body portion 90a on aside closer to the support member 88 when viewed from the mounting portion 90b.

Referring to FIG. 5, the headrest portion 19b of the seat unit 18 is attached to the mounting portion 90b. To the mounting portion 90c, a seat belt shoulder anchor (not illustrated) for the center seat 18b, for example, is attached.

The support member 90 further includes a pair of connecting portions 90d, 90e fixed to the main body portion 90a. The connecting portion 90d is on a side closer to the support member 88 than the mounting portion 90c when viewed from the mounting portion 90b, whereas the connecting portion 90e is on a side closer to the support member 92 when viewed from the mounting portion 90b. As has been described earlier, the connecting portion 90d is connected to the connecting portion 88d of the support member 88. The connecting portion 90e is connected to a connecting portion 92d, which will be described later, of the support member 92 with unillustrated fasteners (such as bolts and nuts) for example.

Referring to FIG. 5, without going into detail, the support member 90 further includes a pair of connecting portions 90f, 90g (see FIG. 6 and FIG. 8) fixed to two end portions (lower end regions) of the main body portion 90a. The main body portion 90a has these two end regions connected detachably from/attachably to the side frame portions 50a, 50b via the pair of connecting portions 90f, 90g. Specifically, the pair of connecting portions 90f, 90g of the support member 90 are connected to the side frame portions 50a, 50b, with unillustrated fasteners (such as bolts and nuts), for example.

The support member 92 includes a main body portion 92a extending in a left-right direction; a mounting portion 92b fixed to an intermediate region of the main body portion 92a; a connecting portion 92c fixed to an end region (right end region in the present preferred embodiment) of the main body portion 92a; and a connecting portion 92d fixed to another end region (left end region in the present preferred embodiment) of the main body portion 92a. To the mounting portion 92b, a headrest portion 19c of the seat unit 18 is attached. The connecting portion 92c is connected detachably from/attachably to the connecting portion 83b of the side cage member 83. Specifically, the connecting portion 92c is connected to the connecting portion 83b of the side cage member 83 with unillustrated fasteners (such as bolts and nuts), for example.

As has been described earlier, the connecting portion 92d is connected to the connecting portion 90e of the support member 90.

Due to the arrangement described above, the cross member portion 86 is attached detachably from/attachably to the side frame portions 50a, 50b of the frame portion 16 and the side cage members 82, 83 of the roll-over protection cage 22.

Referring to FIG. 9 through FIG. 13, the vehicle 10 further includes a pair of suspension assemblies 94a, 94b which suspend the pair of front wheels 12 (see FIG. 1); a rotation transmission portion 96 which transmits rotation from an engine 178 (see FIG. 14) to be described later to the pair of front wheels 12; a pair of suspension assemblies 98a, 98b which suspend the pair of rear wheels 14 (see FIG. 1); a rotation transmission portion 100 which transmits rotation from the engine 178 to the pair of rear wheels 14; and a rear stabilizer 102 which connects the suspension assemblies 98a, 98b to each other. The frame portion 16 (see FIG. 1) is supported by the pair of front wheels 12 and the pair of rear wheels 14 via the suspension assemblies 94a, 94b, 98a, 98b. In the present preferred embodiment, the suspension assemblies 94a, 94b, 98a, 98b preferably are double wishbone type suspension assemblies, for example.

Figure 10:
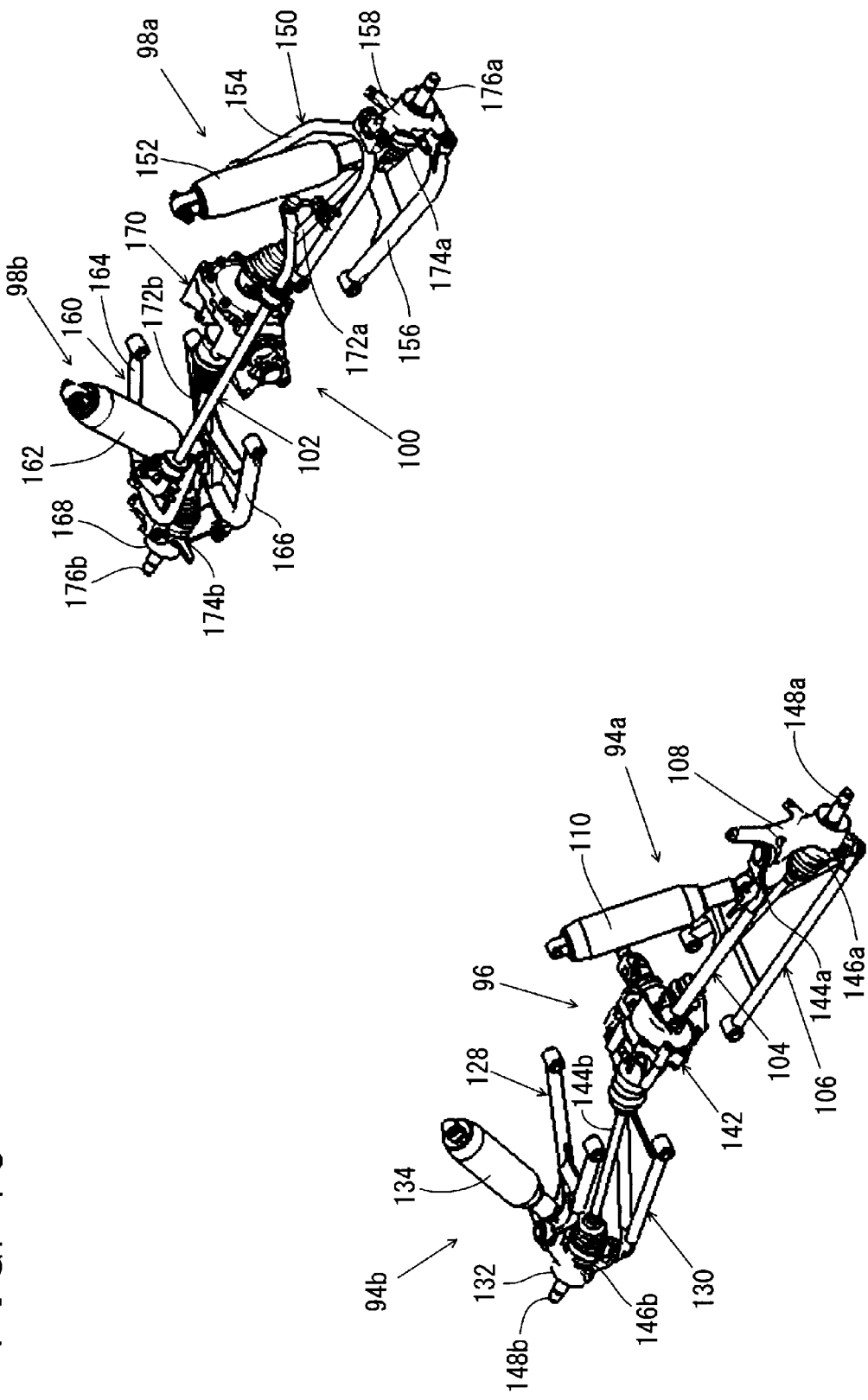
FIG. 10 is a perspective view showing the pair of suspension assemblies for front wheels and the pair of suspension assemblies for rear wheels.
Figure 11:
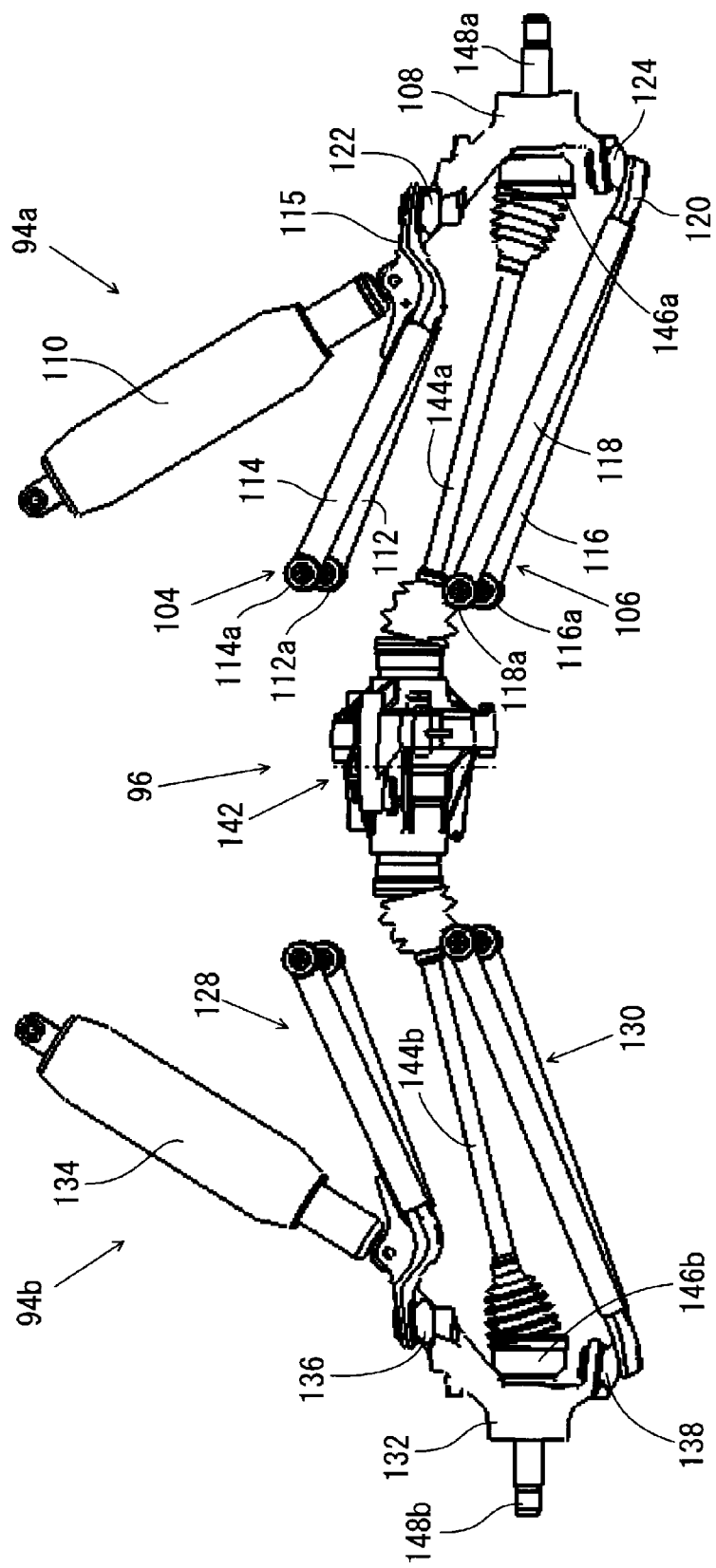
FIG. 11 is a front view showing the pair of suspension assemblies for front wheels and the rotation transmission portion for the front wheels.

Referring to FIG. 10 and FIG. 11, the suspension assembly 94a includes an upper arm 104, a lower arm 106, a knuckle arm 108 and a shock absorber 110. The upper arm 104 and the lower arm 106 are provided by A arms, for example.

Referring to FIG. 11, the upper arm 104 includes a rear arm portion 112 which includes a first end portion 112a; a front arm portion 114 which includes a second end portion 114a and is at a more forward position than the rear arm portion 112; and a connecting portion 115 which connects the rear arm portion 112 and the front arm portion 114 to each other.

The first end portion 112a is an end region (right end region in the present preferred embodiment) of the rear arm portion 112, whereas the second end portion 114a is an end region (right end region in the present preferred embodiment) of the front arm portion 114. The connecting portion 115 connects another end region (left end region in the present preferred embodiment) of the rear arm portion 112 and another end region (left end region in the present preferred embodiment) of the front arm portion 114 to each other.

The lower arm 106 includes a rear arm portion 116 which includes a first end portion 116a; a front arm portion 118 which includes a second end portion 118a and is at a more forward position than the rear arm portion 116; and a connecting portion 120 which connects the rear arm portion 116 and the front arm portion 118 to each other.

The first end portion 116a is an end region (right end region in the present preferred embodiment) of the rear arm portion 116, whereas the second end portion 118a is an end region (right end region in the present preferred embodiment) of the front arm portion 118. The connecting portion 120 connects another end region (left end region in the present preferred embodiment) of the rear arm portion 116 and another end region (left end region in the present preferred embodiment) of the front arm portion 118 to each other.

Figure 9:
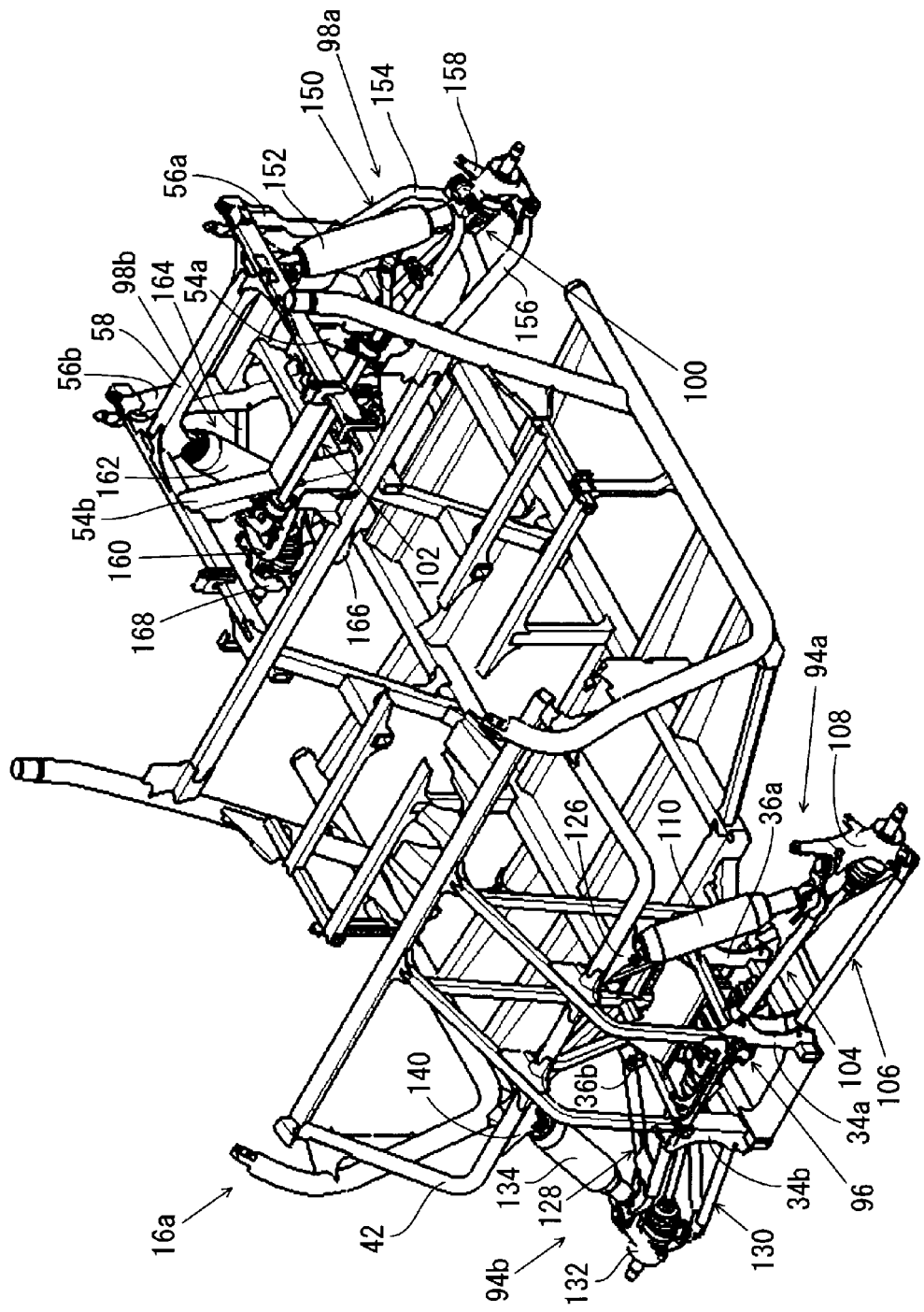
FIG. 9 is a perspective view of the main frame portion, a pair of suspension assemblies for front wheels, a rotation transmission portion for the front wheels, a pair of suspension assemblies for rear wheels, and a rotation transmission portion for the rear wheels.

Referring to FIG. 9, the upper arm 104 is supported by the support frame portions 34a, 36a pivotably in an up-down direction. More specifically, referring to FIG. 11, the first end portion 112a of the rear arm portion 112 is pivotably supported at an upper end region of the support frame portion 36a (see FIG. 9), whereas the second end portion 114a of the front arm portion 114 is pivotably supported at an upper end region of the support frame portion 34a (see FIG. 9).

Referring to FIG. 9, the lower arm 106 is supported by the support frame portions 34a, 36a pivotably in an up-down direction at a lower position than the upper arm 104. More specifically, referring to FIG. 11, the first end portion 116a of the rear arm portion 116 is pivotably supported at a lower end region of the support frame portion 36a (see FIG. 9), whereas the second end portion 118a of the front arm portion 118 is pivotably supported at a lower end region of the support frame portion 34a (see FIG. 9).

The connecting portion 115 of the upper arm 104 is connected to an upper end region of the knuckle arm 108 via a ball joint 122, whereas the connecting portion 120 of the lower arm 106 is connected to a lower end region of the knuckle arm 108 via a ball joint 124. Thus, the upper arm 104 and the lower arm 106 are pivotable in an up-down direction with respect to the knuckle arm 108. Also, the knuckle arm 108 is pivotable in a fore-aft direction with respect to the upper arm 104 and the lower arm 106.

The shock absorber 110 has a lower end region supported pivotably in a left-right direction by the upper arm 104 (the connecting portion 115). Referring to FIG. 9, the shock absorber 110 has an upper end region supported pivotably in a left-right direction by the U-shaped or substantially U-shaped frame portion 42 via a support member 126. Referring to FIG. 6, the support member 126 has a shape of an inverted letter of U in a side view, and is fixed to the U-shaped or substantially U-shaped frame portion 42.

Referring to FIG. 10 and FIG. 11, without going into detail, the suspension assembly 94b is symmetrical to the suspension assembly 94a in a left-right direction, and includes an upper arm 128, a lower arm 130, a knuckle arm 132, and a shock absorber 134. The knuckle arm 132 is connected to the upper arm 128 and the lower arm 130 via ball joints 136, 138.

The shock absorber 134 has a lower end region supported by the upper arm 128 pivotably in a left-right direction. Referring to FIG. 9, the shock absorber 134 has an upper end region supported pivotably in a left-right direction by the U-shaped or substantially U-shaped frame portion 42 via a support member 140. Like the support member 126, the support member 140 has a shape of an inverted letter of U in a side view, and is fixed to the U-shaped or substantially U-shaped frame portion 42.

Referring to FIG. 10 and FIG. 11, the rotation transmission portion 96 includes a differential device 142, a pair of drive shafts 144a, 144b, a pair of constant-velocity joints 146a, 146b, and a pair of axles 148a, 148b. The differential device 142 is located between the suspension assembly 94a and the suspension assembly 94b in the width direction of the vehicle 10. Without going into detail, the differential device 142 is supported by the main frame portion 16a. The differential device 142 is connected to the engine 178 (see FIG. 14) which will be described later, via a propeller shaft 180 (see FIG. 14) which will be described later. The drive shafts 144a, 144b connect the differential device 142 with the constant-velocity joints 146a, 146b. The constant-velocity joint 146a and the axle 148a are connected to each other and are supported rotatably by the knuckle arm 108. The constant-velocity joint 146b and the axle 148b are connected to each other and are supported rotatably by the knuckle arm 132. The axle 148a supports the left front wheel 12 (see FIG. 1), whereas the axle 148b supports the right front wheel 12 (see FIG. 1).

The suspension assemblies 98a, 98b and the rotation transmission portion 100 can be provided by any of appropriate known components, so the suspension assemblies 98a, 98b and the rotation transmission portion 100 will be described only briefly.

Figure 12:
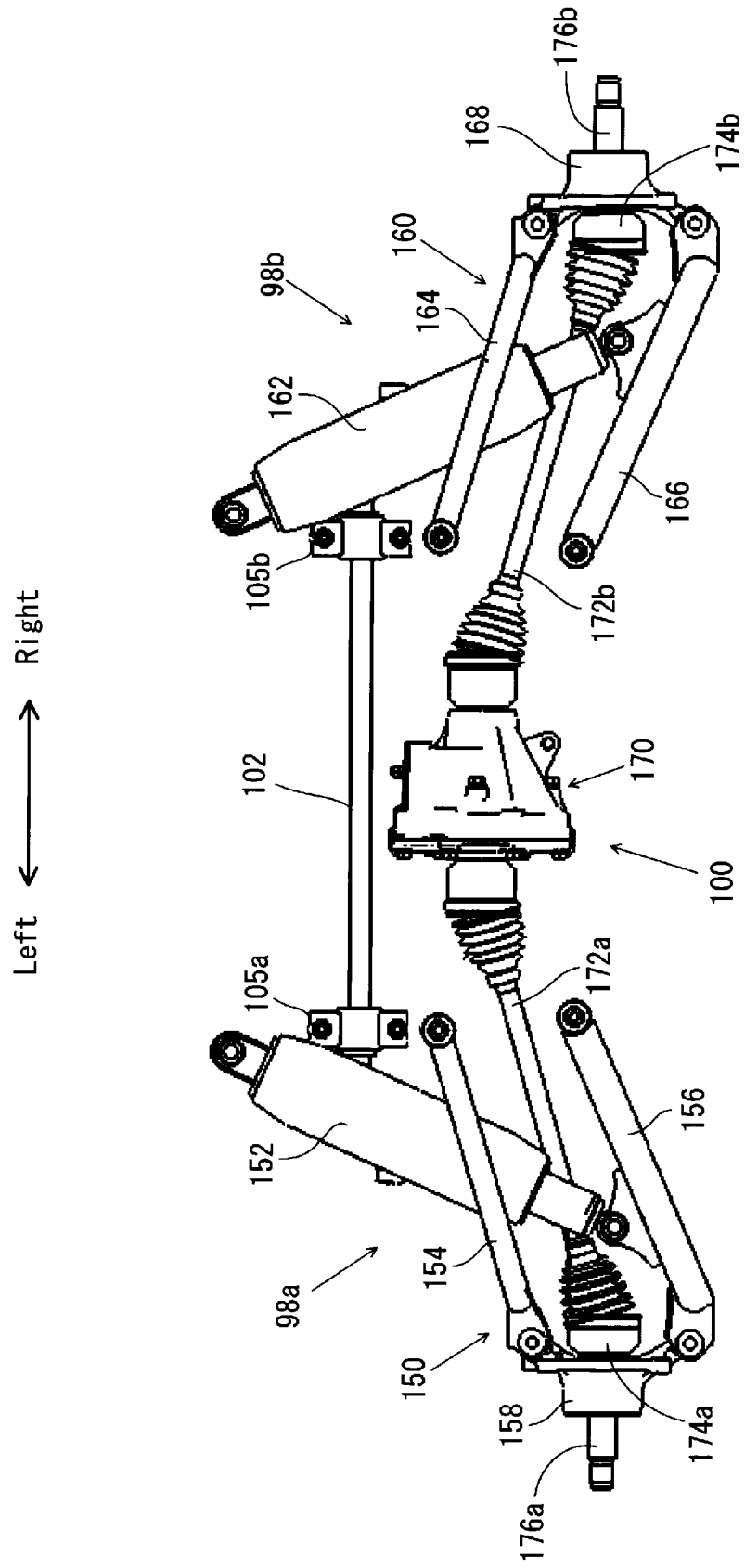
FIG. 12 is a rear view showing the pair of suspension assemblies for rear wheels, the rotation transmission portion for the rear wheels, and a rear stabilizer.
Figure 13:
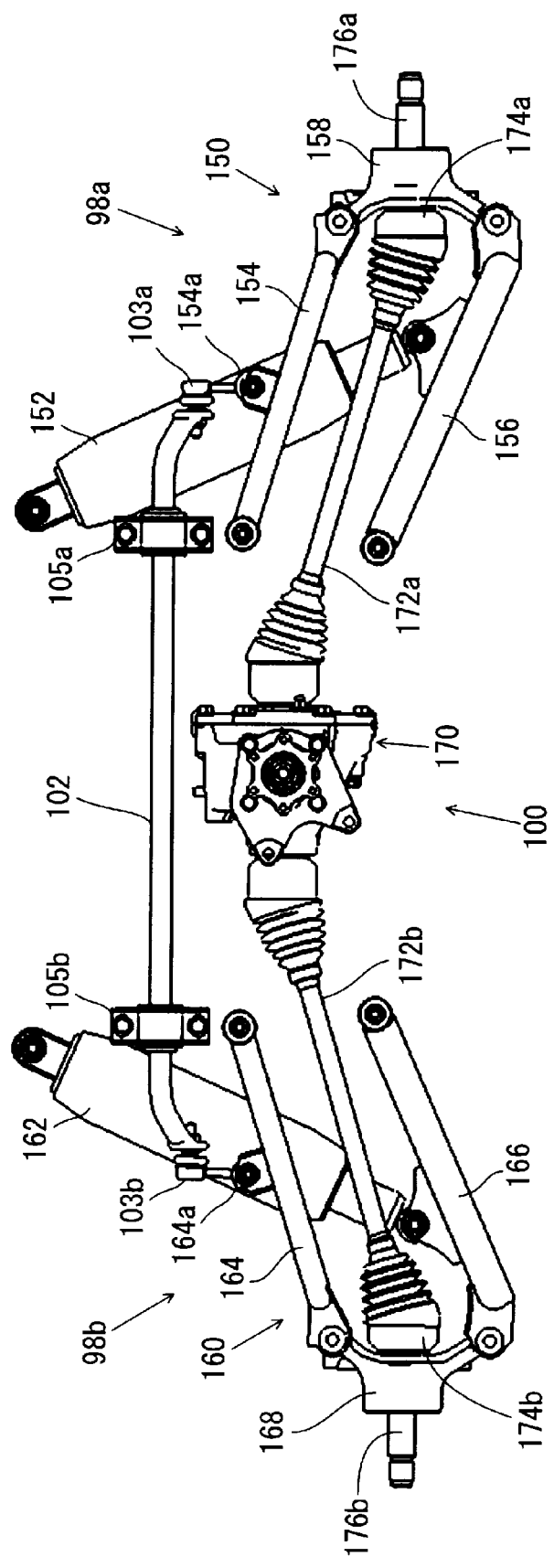
FIG. 13 is a front view showing the pair of suspension assemblies for rear wheels, the rotation transmission portion for the rear wheels, and the rear stabilizer.

Referring to FIG. 10, FIG. 12 and FIG. 13, the suspension assembly 98a includes an arm portion 150 and a shock absorber 152. In the present preferred embodiment, the arm portion 150 includes an upper arm 154, a lower arm 156 and a knuckle arm 158. Referring to FIG. 9, the upper arm 154 is supported by the support frame portions 54a, 56a pivotably in an up-down direction. The lower arm 156 is supported by the support frame portions 54a, 56a pivotably in an up-down direction at a lower position than the upper arm 154. More specifically, the upper arm 154 is supported at substantially intermediate regions in an up-down direction of the support frame portions 54a, 56a, whereas the lower arm 156 is supported by lower end regions of the support frame portions 54a, 56a. The shock absorber 152 connects the main frame portion 16a and the arm portion 150 (lower arm 156 in the present embodiment) to each other. More specifically, the shock absorber 152 has an upper end region supported pivotably by an end region (left end region in the present embodiment) of the cross member 58, whereas the shock absorber 152 has a lower end region supported pivotably by the lower arm 156.

Referring to FIG. 10, FIG. 12 and FIG. 13, the suspension assembly 98b is symmetrical with the suspension assembly 98a in a left-right direction, and includes an arm portion 160 and a shock absorber 162. In the present preferred embodiment, the arm portion 160 includes an upper arm 164, a lower arm 166 and a knuckle arm 168. Referring to FIG. 9, the upper arm 164 is supported by the support frame portions 54b, 56b pivotably in an up-down direction. The lower arm 166 is supported by the support frame portions 54b, 56b pivotably in an up-down direction at a lower position than the upper arm 164. More specifically, the upper arm 164 is supported at substantially intermediate regions in an up-down direction of the support frame portions 54b, 56b, whereas the lower arm 166 is supported by lower end regions of the support frame portions 54b, 56b. The shock absorber 162 connects the main frame portion 16a and the arm portion 160 (lower arm 166 in the present preferred embodiment) to each other. More specifically, the shock absorber 162 has an upper end region supported pivotably by another end region (right end region in the present embodiment) of the cross member 58, whereas the shock absorber 162 has a lower end region supported pivotably by the lower arm 166.

Referring to FIG. 10, the rear stabilizer 102 is at a more forward position than the shock absorbers 152, 162, and connects the arm portion 150 of the suspension assembly 98a and the arm portion 160 of the suspension assembly 98b to each other. In the present preferred embodiment, the rear stabilizer 102 connects the upper arm 154 and the upper arm 164 to each other. Specifically, referring also to FIG. 12 and FIG. 13, the rear stabilizer 102 has an end region which is connected to a flange portion 154a of the upper arm 154 via a connecting member 103a, whereas the rear stabilizer 102 has another end region which is connected to a flange portion 164a of the upper arm 164 via a connecting member 103b. The rear stabilizer 102 is supported by the pair of support frame portions 54a, 54b. Specifically, the rear stabilizer 102 is fixed to substantially intermediate regions in an up-down direction of the support frame portions 54a, 54b by mounting members 105a, 105b.

Referring to FIG. 10, FIG. 12 and FIG. 13, the rotation transmission portion 100 includes a differential device 170, a pair of drive shafts 172a, 172b, a pair of constant-velocity joints 174a, 174b, and a pair of axles 176a, 176b. The differential device 170 is located between the suspension assembly 98a and the suspension assembly 98b in the width direction of the vehicle 10. Without going into detail, the differential device 170 is supported by the main frame portion 16a. The differential device 170 is connected to the engine 178 (see FIG. 14) which will be described later, via a propeller shaft 182 (see FIG. 14) which will be described later.

The drive shafts 172a, 172b extend in the width direction of the vehicle 10, connecting the differential device 170 with the constant-velocity joints 174a, 174b. The constant-velocity joints 174a and the axle 176a are connected to each other and are supported rotatably by the knuckle arm 158. The constant-velocity joints 174b and the axle 176b are connected to each other and are supported rotatably by the knuckle arm 168. The axle 176a supports the left rear wheel 14 (see FIG. 5), whereas the axle 176b supports the right rear wheel 14 (see FIG. 5).

Figure 14:
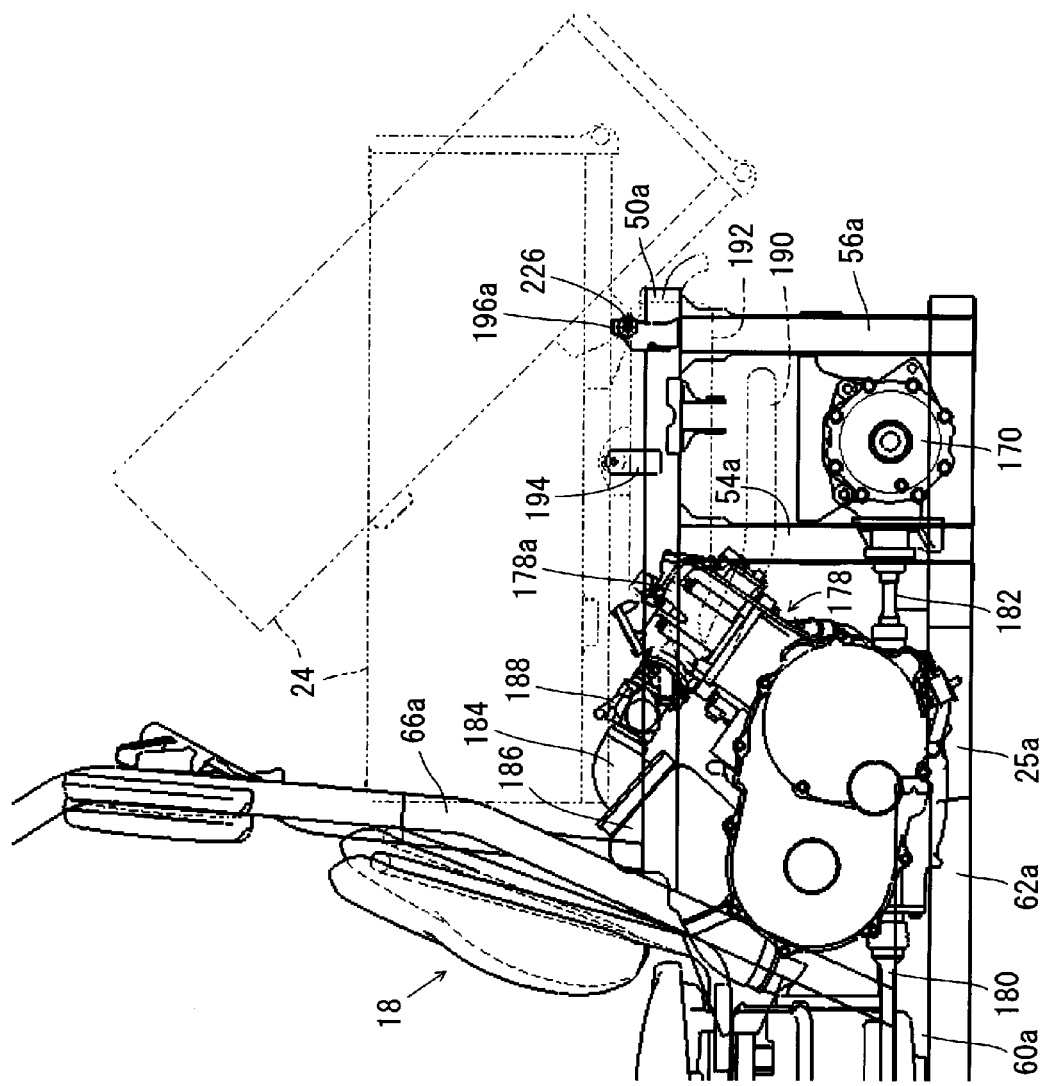
FIG. 14 is a side view showing a rearward region of the main frame portion, an engine and surrounds thereof.

Referring to FIG. 14, the engine 178 is supported at a rearward region of the main frame portion 16a. Referring to FIG. 7 and FIG. 14, a majority of the engine 178 is located within a space surrounded by the side frame portions 25a, 25b, the side frame portions 46a, 46b, the support frame portions 48a, 48b, the side frame portions 50a, 50b, and the support frame portions 54a, 54b. The engine 178 is located at a position behind the seat unit 18 and below the cargo bed 24, being slightly tilted rearward. In the present preferred embodiment, at least a portion of the engine 178 is at a more rearward position than the roll-over protection cage 22.

Referring to FIG. 14, at a substantially intermediate region in the width direction of the vehicle 10, the propeller shaft 180 extends forward from a lower end region of the engine 178, whereas the propeller shaft 182 extends rearward from a lower end region of the engine 178. Therefore, the propeller shaft 182 extends in a fore-aft direction in a more rearward region than the engine 178.

The propeller shaft 180 is connected to the differential device 142 (see FIG. 10), whereas the propeller shaft 182 is connected to the differential device 170 (see FIG. 10). Referring to FIG. 11 and FIG. 14, rotation from the engine 178 is transmitted by the propeller shaft 180, the differential device 142, the drive shafts 144a, 144b, the constant-velocity joints 146a, 146b, and the axles 148a, 148b, to the pair of front wheels 12. Thus, the pair of front wheels 12 are rotated. Also, referring to FIG. 12 through FIG. 14, rotation from the engine 178 is transmitted by the propeller shaft 182, the differential device 170, the drive shafts 172a, 172b, the constant-velocity joints 174a, 174b, and the axles 176a, 176b, to the pair of rear wheels 14. Thus, the pair of rear wheels 14 are rotated.

Referring to FIG. 14, the engine 178 includes a cylinder head 178a, to which an air cleaner 186 is connected via an air intake tube 184. The air cleaner 186 is at a position forward of the engine 178. The air intake tube 184 is provided with a throttle body 188. The cylinder head 178a is connected to a muffler 192 via an exhaust pipe 190. The muffler 192 is disposed on a left and rear side of the engine 178, on a left side of the side frame portion 50a. The muffler 192 is supported by the side frame portion 50a via a support member 194.

The vehicle 10 further includes a transfer mechanism (not illustrated) which transmits movements of the steering wheel 20 to the pair of front wheels 12. The transfer mechanism can be provided by any appropriate one selected from known mechanisms such as a rack and pinion type transfer mechanism for example, and therefore will not be described herein.

Figure 2:
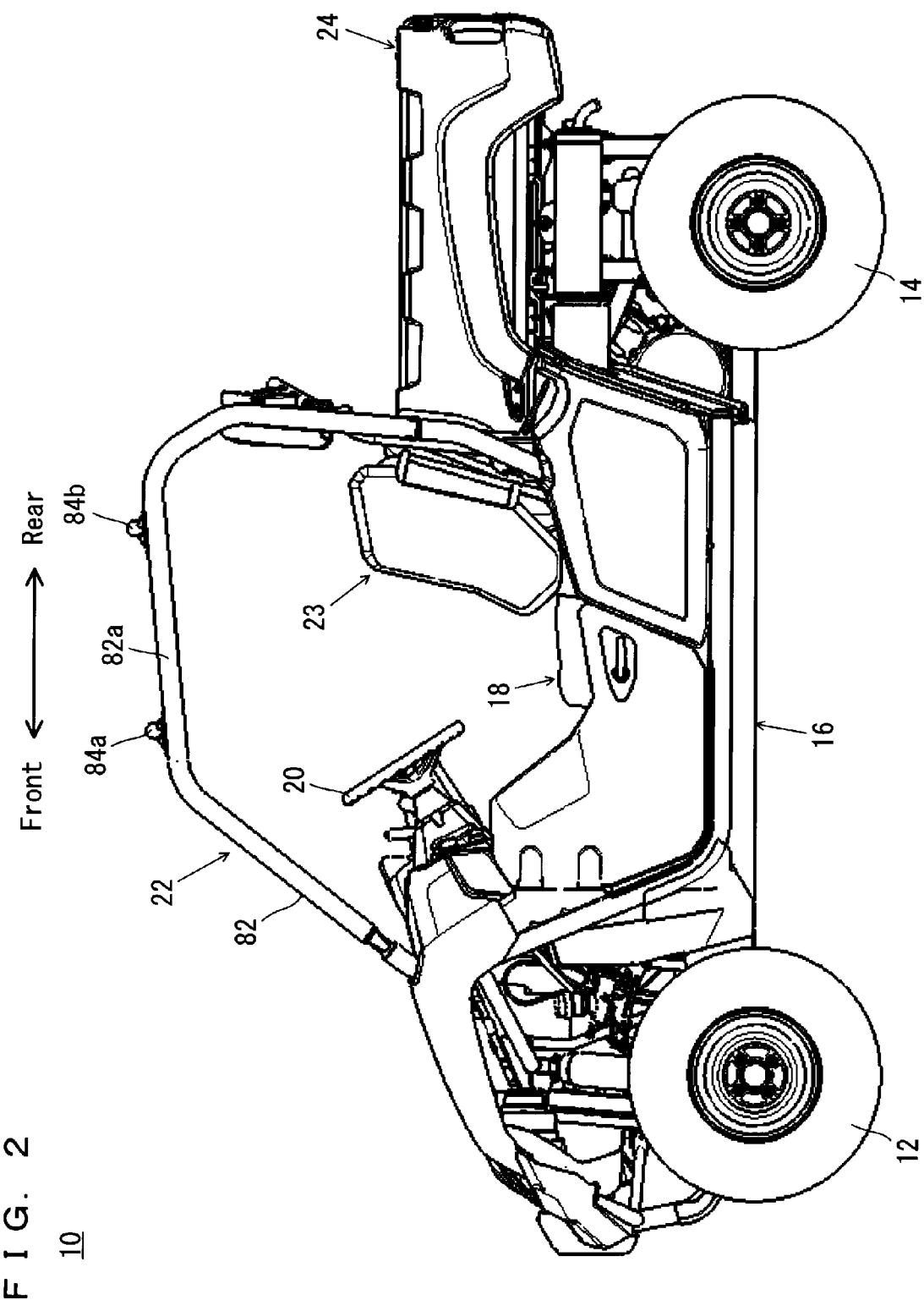
FIG. 2 is a side view of the vehicle.

Referring to FIG. 2, FIG. 6 and FIG. 7, the pair of side frame portions 50a, 50b which extend in a fore-aft direction below the cargo bed 24 includes a pair of first supporting portions 196a, 196b which support a rear portion of the cargo bed 24 pivotably; and a pair of second supporting portions 198a, 198b which are at a more forward position than the pair of first supporting portions 196a, 196b and support a forward portion of the cargo bed 24.

Figure 15:
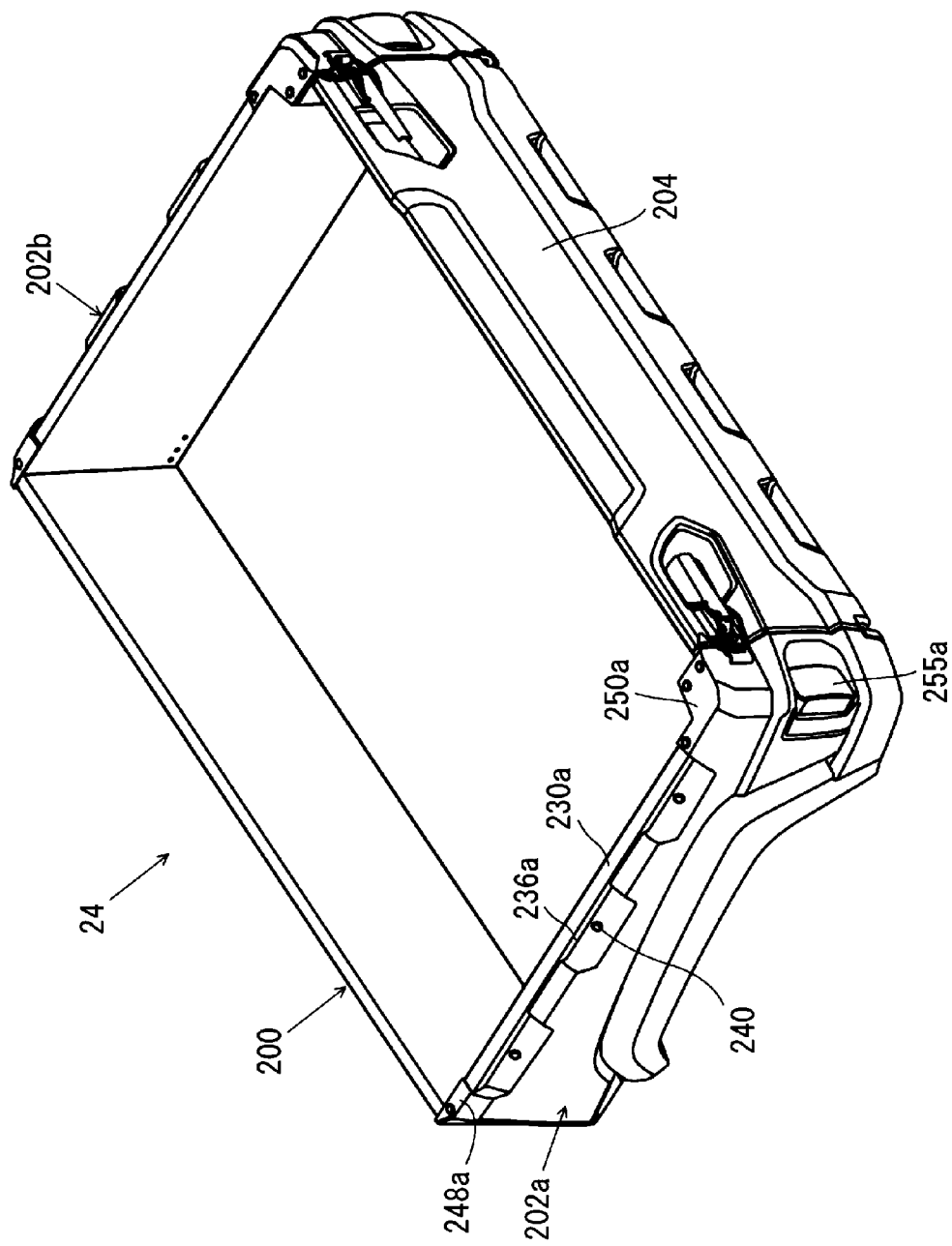
FIG. 15 is a perspective view of a cargo bed from an above and rear view point.
Figure 16:
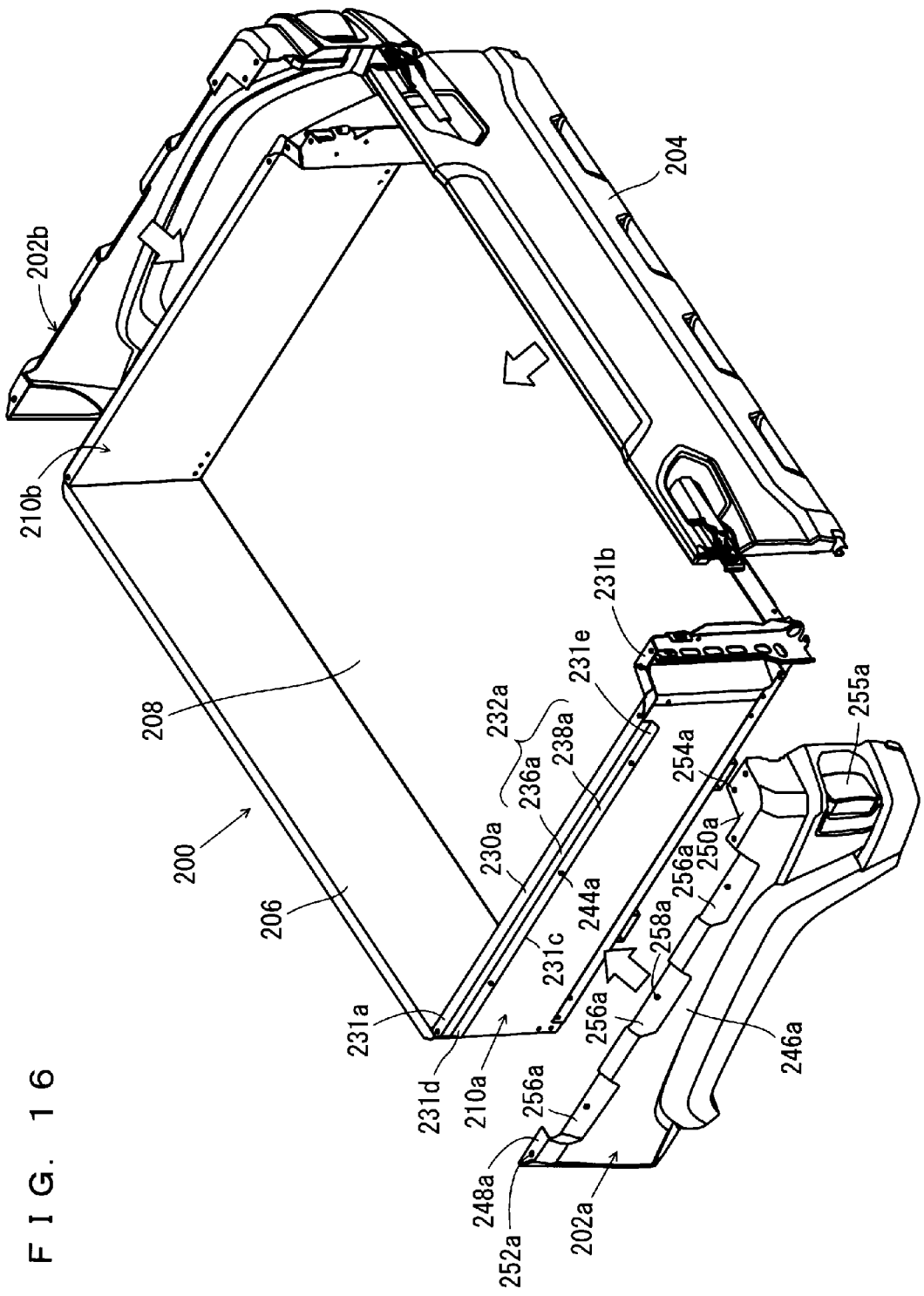
FIG. 16 is an exploded perspective view of the cargo bed from a left, above and rear view point.
Figure 17:
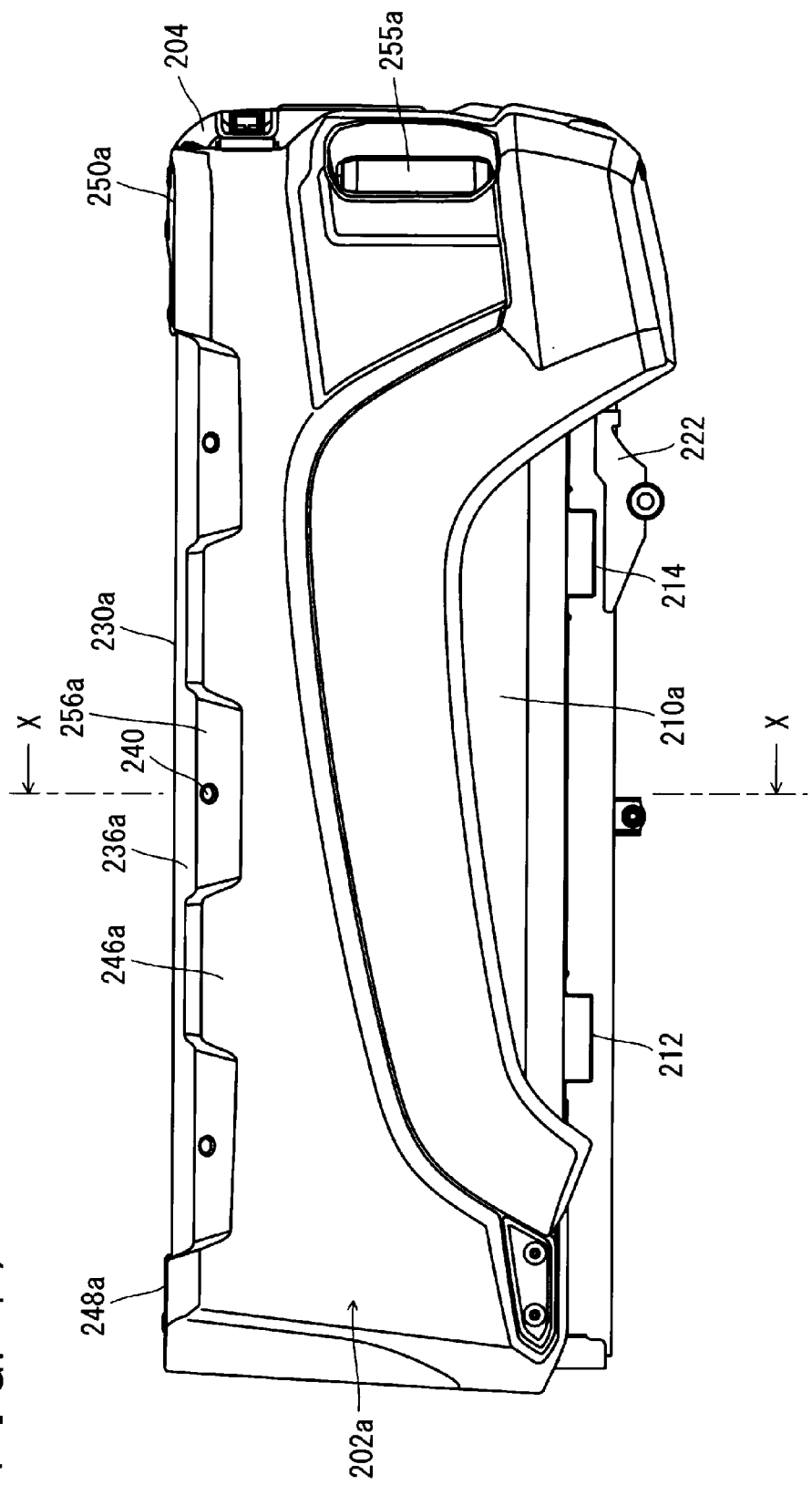
FIG. 17 is a side view of the cargo bed.

Referring to FIG. 15 through FIG. 17, the cargo bed 24 includes a main body portion 200, a pair of rear fenders 202a, 202b and a tail gate 204.

The main body portion 200 contains a metal, for example, as a material and is formed as an upward opening box. The main body portion 200 includes a front wall portion 206, a bottom portion 208 and a pair of side wall portions 210a, 210b. The front wall portion 206 preferably is rectangular or substantially rectangular, extending in an up-down direction and in a left-right direction. The bottom portion 208 is preferably rectangular or substantially rectangular, extending rearward from a lower edge region of the front wall portion 206. The pair of side wall portions 210a, 210b are rectangular or substantially rectangular, extending upward from respective edge regions of the bottom portion 208 in a left-right direction and connected to respective edge regions of the front wall portion 206 in the left-right direction.

Figure 18:
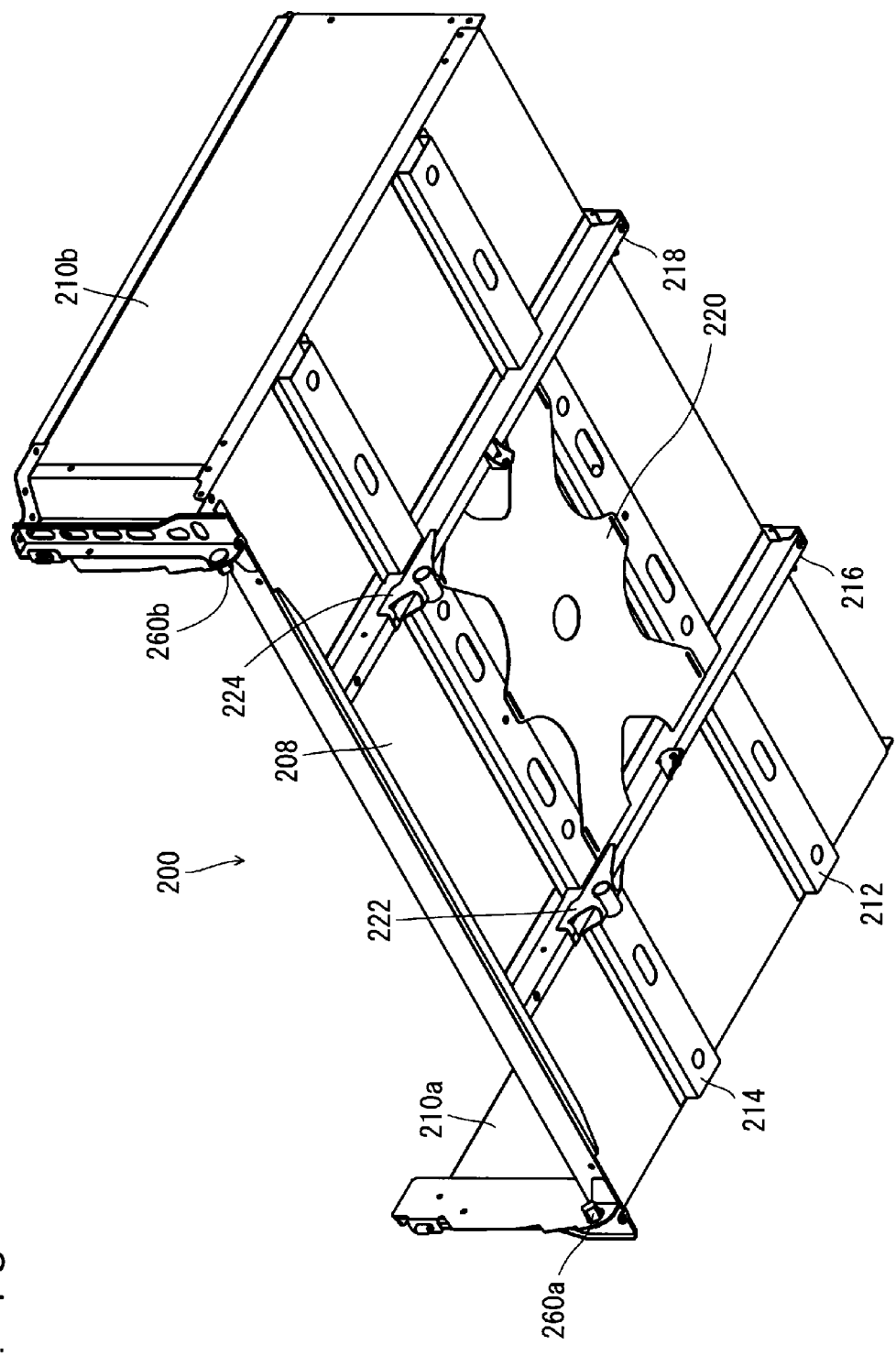
FIG. 18 is a perspective view of a main body portion of the cargo bed from a rear and below view point.
Figure 19:
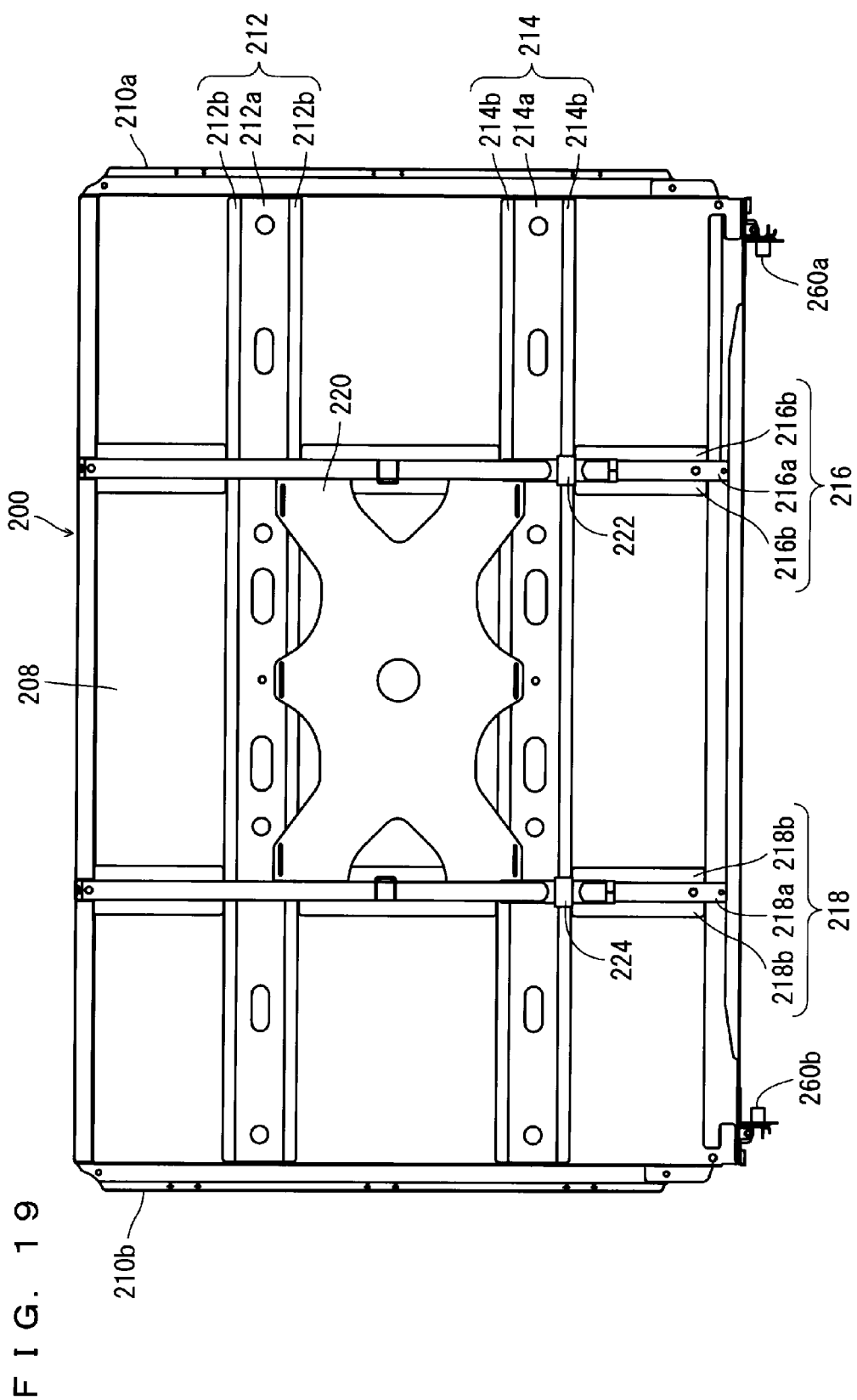
FIG. 19 is a bottom view of the main body portion of the cargo bed.

Referring to FIG. 18 and FIG. 19, the bottom portion 208 of the main body portion 200 has a lower surface with reinforcing portions 212, 214 which extend in the width direction of the vehicle 10. The reinforcing portions 212, 214 are, for example, platy members each having a U-shaped or substantially U-shaped section, and disposed in parallel or substantially in parallel to each other at an interval in the fore-aft direction of the vehicle 10. Specifically, the reinforcing portion 212 includes a protruding portion 212a and mounting portions 212b on two side of the protruding portion 212a. The mounting portions 212b are attached to the lower surface of the bottom portion 208, whereas the protruding portion 212a protrudes downward from the mounting portions 212b. Likewise, the reinforcing portion 214 includes a protruding portion 214a and mounting portions 214b on two side of the protruding portion 214a. The mounting portions 214b are attached to the lower surface of the bottom portion 208, whereas the protruding portion 214a protrudes downward from the mounting portions 214b. In the present preferred embodiment, the reinforcing portions 212, 214 preferably are identical with each other.

The bottom portion 208 of the main body portion 200 has its lower surface provided with reinforcing portions 216, 218 which are disposed at a right angle across the reinforcing portions 212, 214 (in the fore-aft direction of the vehicle 10). The reinforcing portions 216, 218 are, for example, platy members each having a U-shaped or substantially U-shaped section, and disposed in parallel or substantially in parallel to each other at an interval in the width direction of the vehicle 10. Specifically, the reinforcing portion 216 includes a protruding portion 216a and mounting portions 216b on two side of the protruding portion 216a. The mounting portions 216b are attached to the lower surface of the bottom portion 208, whereas the protruding portion 216a protrudes downward from the mounting portions 216b. Likewise, the reinforcing portion 218 includes a protruding portion 218a and mounting portions 218b on two sides of the protruding portion 218a. The mounting portions 218b are attached to the lower surface of the bottom portion 208, whereas the protruding portion 218a protrudes downward from the mounting portions 218b. In the present preferred embodiment, the reinforcing portions 216, 218 are identical with each other.

The lower surface of the bottom portion 208 in the main body portion 200 has an intermediate region provided with platy reinforcing portion 220 which connects the reinforcing portions 212, 214, 216 and 218 to each other.

Also, flange portions 222, 224 are attached respectively to the protruding portions 216a, 218a of the reinforcing portions 216, 218. Each of the flange portions 222, 224 is connected to corresponding one of the first supporting portions 196a, 196b on the side frames 50a, 50b via a connecting member 226 (see FIG. 14). Thus, the cargo bed 24 is pivotable in an up-down direction around an axis defined by the connecting members. In other words, the cargo bed 24 is supported pivotably by the frame portion 16, behind the roll-over protection cage 22.

Figure 20:
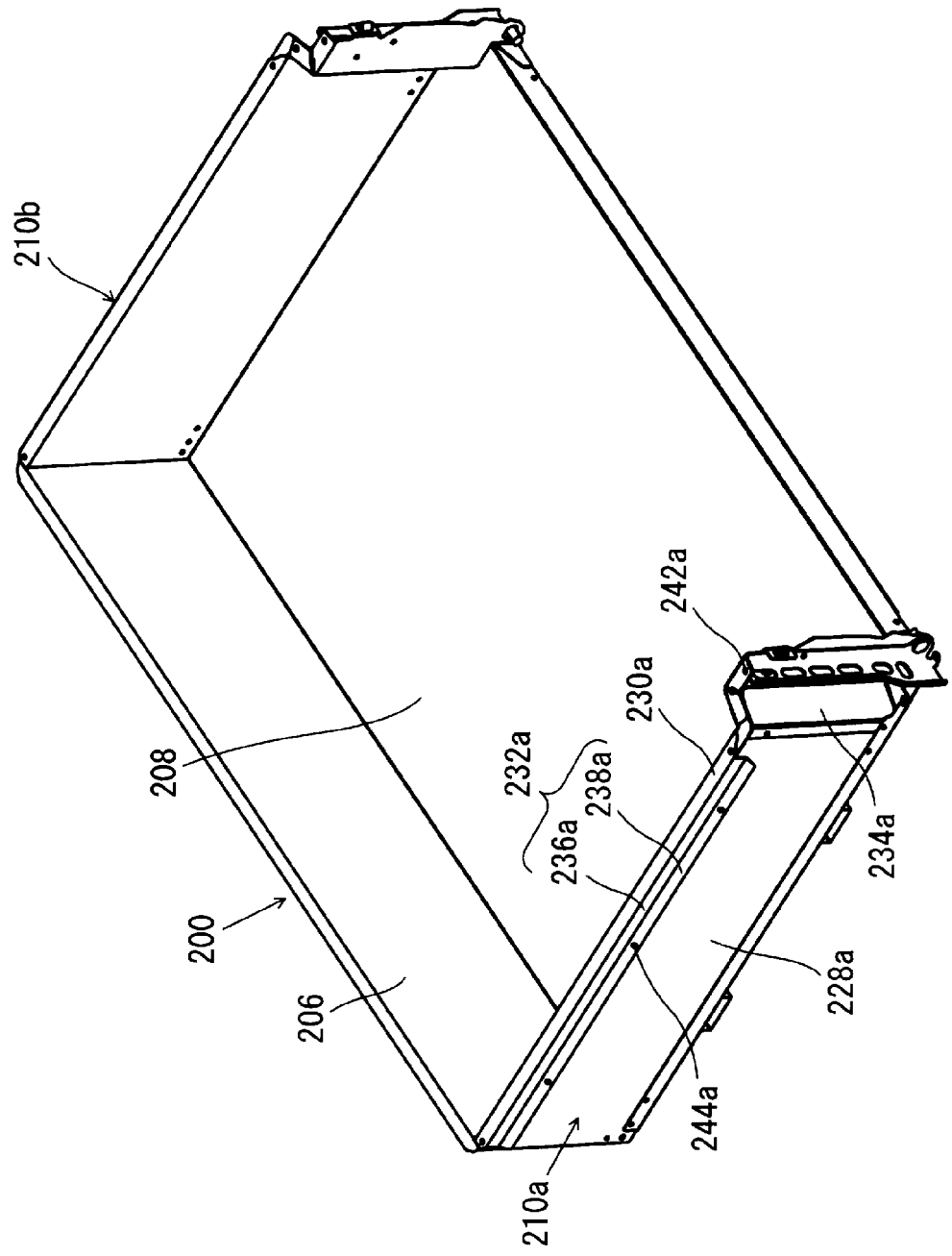
FIG. 20 is a perspective view of the main body portion of the cargo bed from a rear and above view point.
Figure 21:
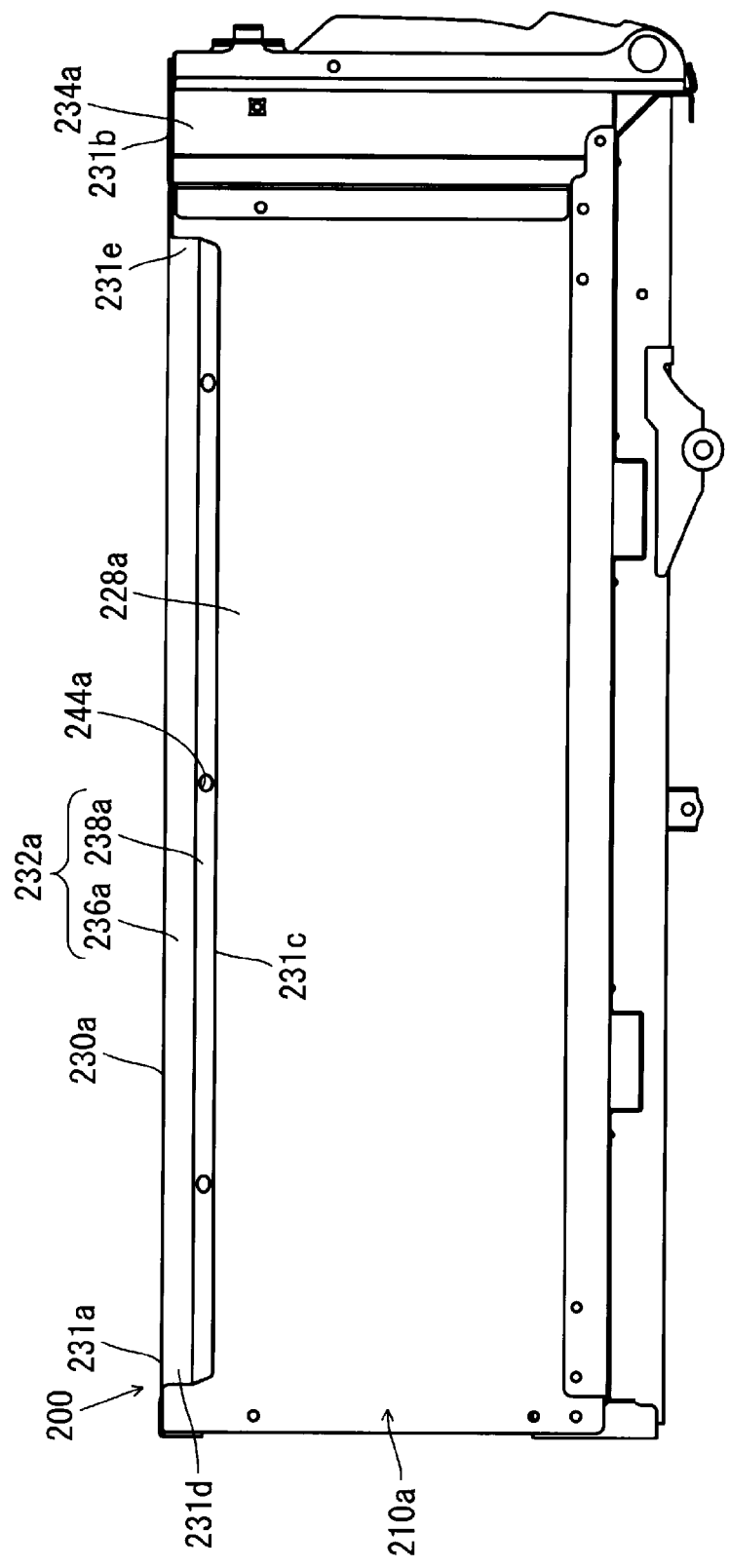
FIG. 21 is a side view of the main body portion of the cargo bed.
Figure 24:
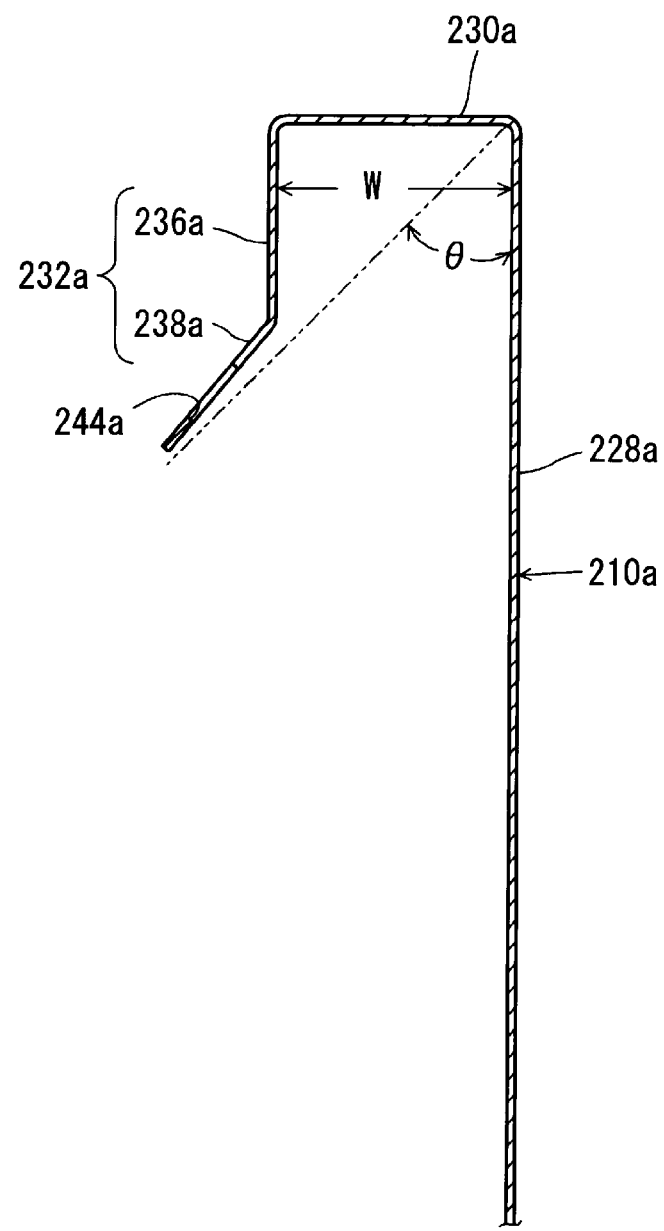
FIG. 24 is a sectional view showing the upper end region of the side wall portion.

Referring to FIG. 20, FIG. 21 and FIG. 24, the side wall portion 210a includes a main side wall 228a, a first flange portion 230a and a second flange portion 232a. The main side wall 228a extends upward from a left edge of the bottom portion 208, whereas the main side wall 228a has a rearward end portion 234a receding inward. The first flange portion 230a extends in a left-right direction from an upper edge of the main side wall 228a, to an outside of the main body portion 200. The second flange portion 232a extends downward from an outer edge of the first flange portion 230a. Specifically, the second flange portion 232a includes a first region 236a extending downward from an outer edge of the first flange portion 230a, and a second region 238a extending obliquely downward from a lower edge of the first region 236a toward an outside in a left-right direction of the main body portion 200. The second flange portion 232a is not provided in a rearward end region of the side wall portion 210a.

Figure 23:
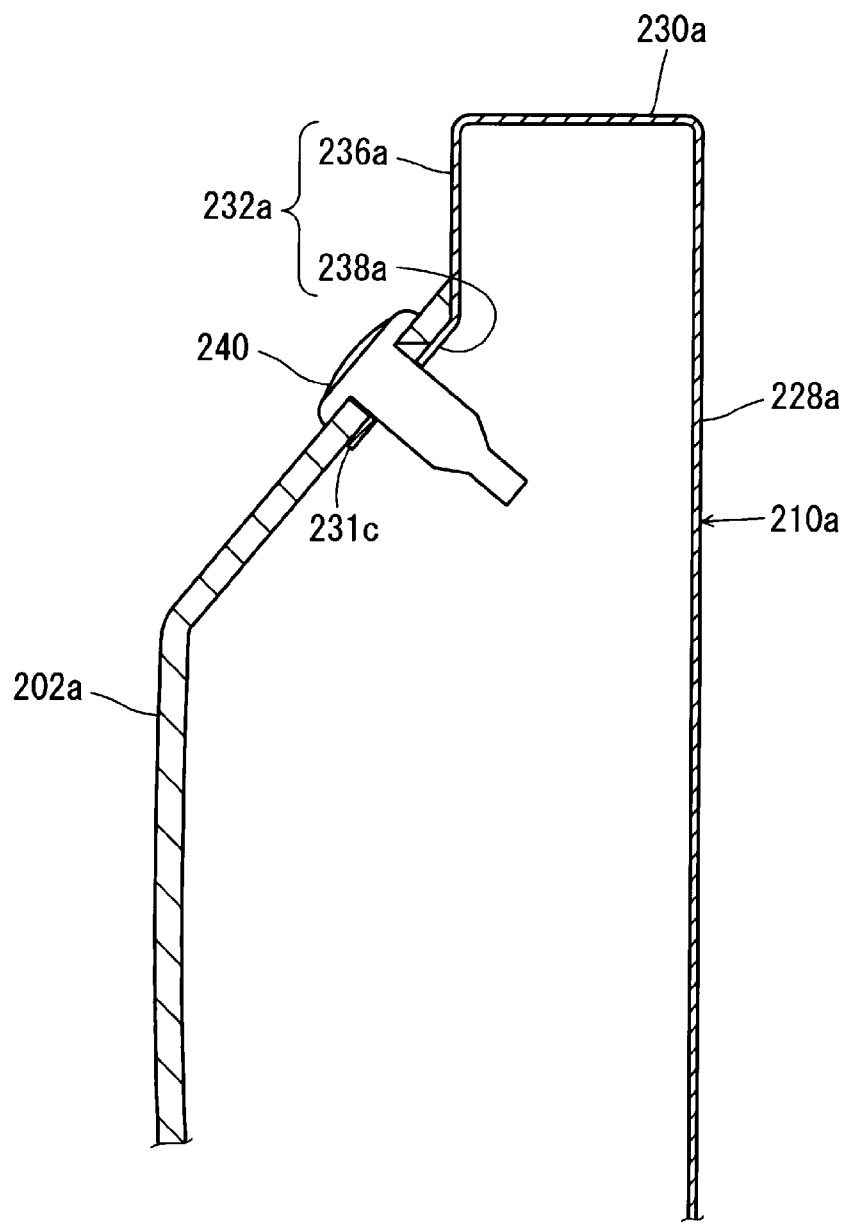
FIG. 23 is a sectional view showing an upper end region of a side wall portion and an upper end region of a rear fender.

Therefore, as shown in FIG. 24, a portion of the side wall portion 210a where the main side wall 228a, the first flange portion 230a and the second flange portion 232a continue one after another has a longitudinal section which has a shape of an inverted letter of J or substantially of an inverted letter of J. The first flange portion 230a has its forward end region 231a and rearward end region 231b formed with a plurality (a total of four in the present embodiment) of holes 242a for attaching fasteners 240 (see FIG. 23) such as rivets made of resin, for example, whereas the second region 238a of the second flange portion 232a is formed with a plurality (a total of three in the present preferred embodiment) of holes 244a for attaching fasteners 240.

Figure 25:
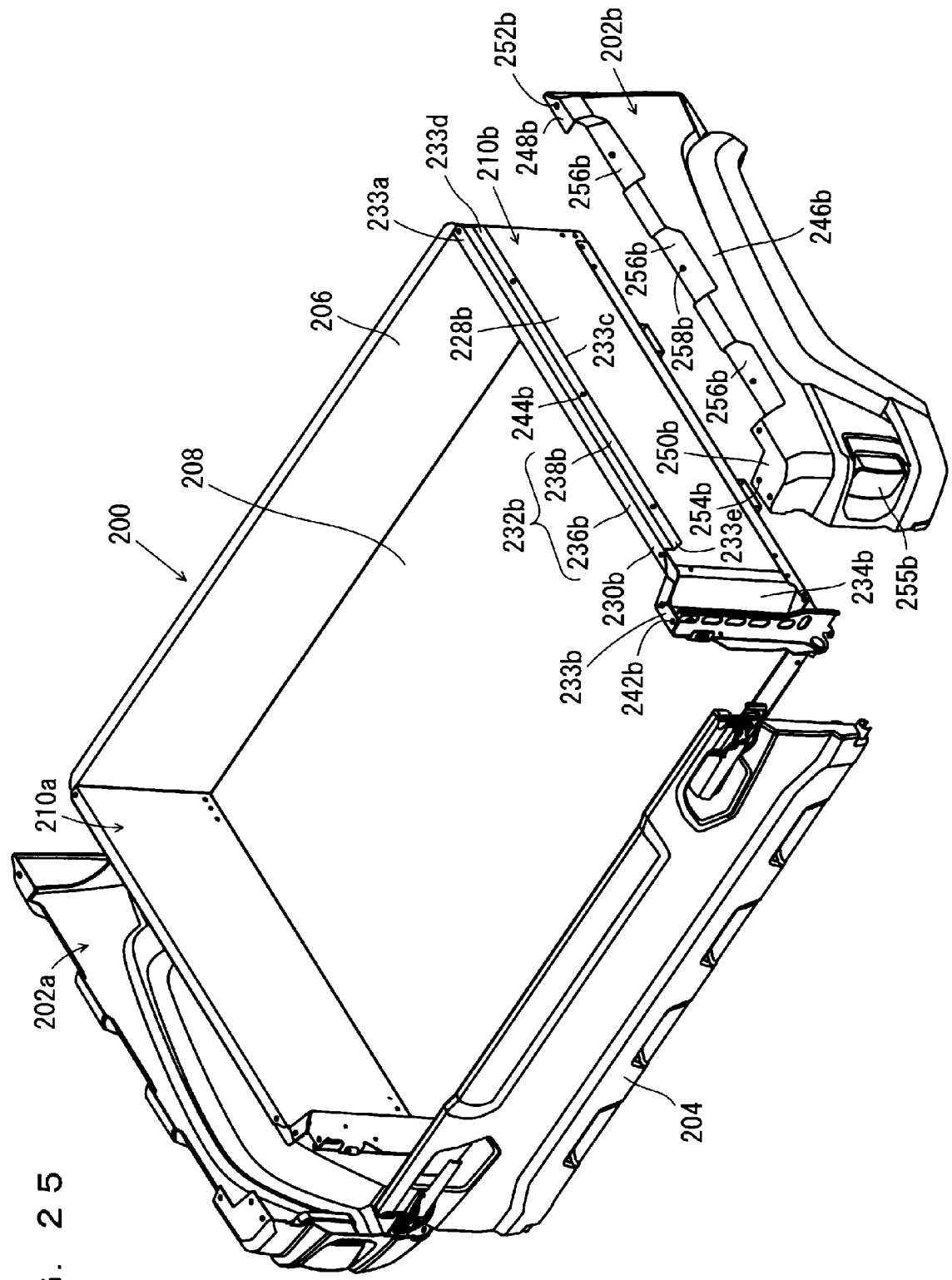
FIG. 25 is an exploded perspective view of the cargo bed from a right, above and rear view point.

The side wall portion 210b is symmetrical with the side wall portion 210a in a left-right direction, so description therefor will be made only briefly. Referring to FIG. 25, like the side wall portion 210a, the side wall portion 210b includes a main side wall 228b, a first flange portion 230b and a second flange portion 232b, and the main side wall 228b has a rearward end portion 234b receding inward. The second flange portion 232b includes a first region 236b and a second region 238b. The first flange portion 230b has its forward end region 233a and rearward end region 233b formed with a plurality of holes 242b for attaching fasteners 240, whereas the second flange portion 232b has its second region 238b formed with a plurality of holes 244b for attaching fasteners 240.

Referring to FIG. 24, preferably, in the side wall portion 210a a gap (inner width W) between the main side wall 228a and the first region 236a of the second flange portion 232a is approximately one inch, for example, and the second region 238a is slanted with respect to the main side wall 228a by an angle θ of approximately 45 degrees, for example. The same applies to the side wall portion 210b.

Referring to FIG. 15 through FIG. 17, the pair of rear fenders 202a, 202b is made of materials which contains a resin for example, and are attached to the pair of side wall portions 210a, 210b, respectively.

The rear fender 202a includes a fender main body 246a, a fender forward portion 248a and a fender rearward portion 250a. The fender main body 246a extends in a fore-aft direction. The fender forward portion 248a extends inward from an upper edge of a forward end region of the fender main body 246a. The fender rearward portion 250a extends inward from an upper edge of a rearward end region of the fender main body 246a. The fender forward portion 248a has a hole 252a for attaching a fastener 240; the fender rearward portion 250a has a plurality (three in the present preferred embodiment) of holes 254a for attaching fasteners 240. The fender main body 246a has a rearward end region provided with a tail light 255a. In a side view, the rear fender 202a has a shape with a slightly downward cutout in a fore-aft direction between the fender forward portion 248a and the fender rearward portion 250a, with a plurality (three in the present preferred embodiment) of the mounting portions 256a at positions corresponding to the second region 238a of the second flange portion 232a. The mounting portions 256a are slanted correspondingly to the second region 238a. In each of the mounting portions 256a a hole 258a is formed for attaching a fastener 240.

Figure 22:
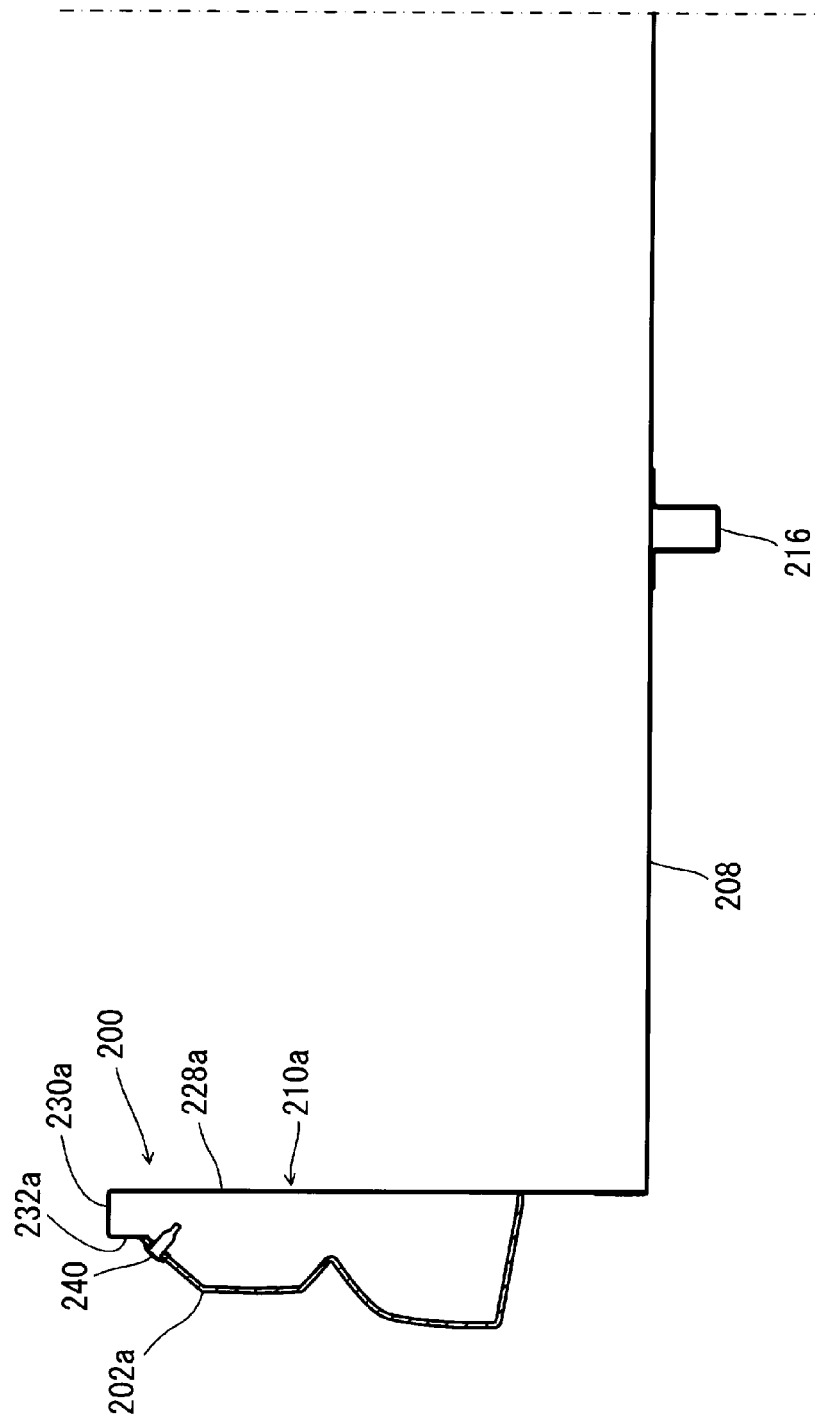
FIG. 22 is a sectional view taken in lines X-X in FIG. 17.

The rear fender 202a described thus far is attached to the side wall portion 210a and covers at least an entire lower edge 231c of the second flange portion 232a. Referring to FIG. 16 and FIG. 21, in the present preferred embodiment, the rear fender 202a covers the entire lower edge 231c of the second flange portion 232a (second region 238a), the forward end region 231a of the first flange portion 230a, the rearward end region 231b of the first flange portion 230a; the forward end region 231d of the second flange portion 232a and the rearward end region 231e of the second flange portion 232a when attached to the side wall portion 210a. Specifically, referring also to FIG. 22 and FIG. 23, the rear fender 202a is placed over the side wall portion 210a, with the three mounting portions 256a of the rear fender 202a in alignment with the second region 238a of the side wall portion 210a. Under this state, a fastener 240 is attached through the hole in the rear fender 202a and the corresponding hole in the side wall portion 210a, to fix the rear fender 202a to the side wall portion 210a. As the rear fender 202a is attached as described, an intermediate region of the first flange portion 230a, and an intermediate region of the first region 236a in the second flange portion 232a are exposed.

The rear fender 202b is symmetrical with the rear fender 202a in a left-right direction, so description will be made only briefly. Referring to FIG. 25, like the rear fender 202a, the rear fender 202b includes a fender main body 246b, a fender forward portion 248b and a fender rearward portion 250b. The fender forward portion 248b has a hole 252b for attaching a fastener 240, whereas the fender rearward portion 250b has a plurality of holes 254b for attaching fasteners 240. The fender main body 246b has a rearward end region provided with a tail light 255b. Also, the rear fender 202b has a plurality of mounting portions 256b at positions corresponding to the second region 238b. Each mounting portion 256b is formed with a hole 258b for attaching a fastener 240.

The rear fender 202b described above is attached to the side wall portion 210b and covers at least an entire lower edge 233c of the second flange portion 232b. Referring to FIG. 25, in the present preferred embodiment, the rear fender 202b covers the entire lower edge 233c of the second flange portion 232b (second region 238b), the forward end region 233a of the first flange portion 230b, the rearward end region 233b of the first flange portion 230b, the forward end region 233d of the second flange portion 232b and the rearward end region 233e of the second flange portion 232b when attached to the side wall portion 210b. The rear fender 202b is attached to the side wall portion 210b in the same fashion as the rear fender 202a is attached to the side wall portion 210a.

The side wall portions 210a, 210b of the main body portion 200 have lower regions of their rearward end portions provided with connecting members 260a, 260b respectively. The side wall portions 210a, 210b are connected to the tail gate 204 via the connecting members 260a, 260b. Thus, the tail gate 204 is openable/closable as it is attached to the rearward end regions of the pair of side wall portions 210a, 210b. The tail gate 204 is made of materials which include a metal and a resin, for example.

Figure 26:
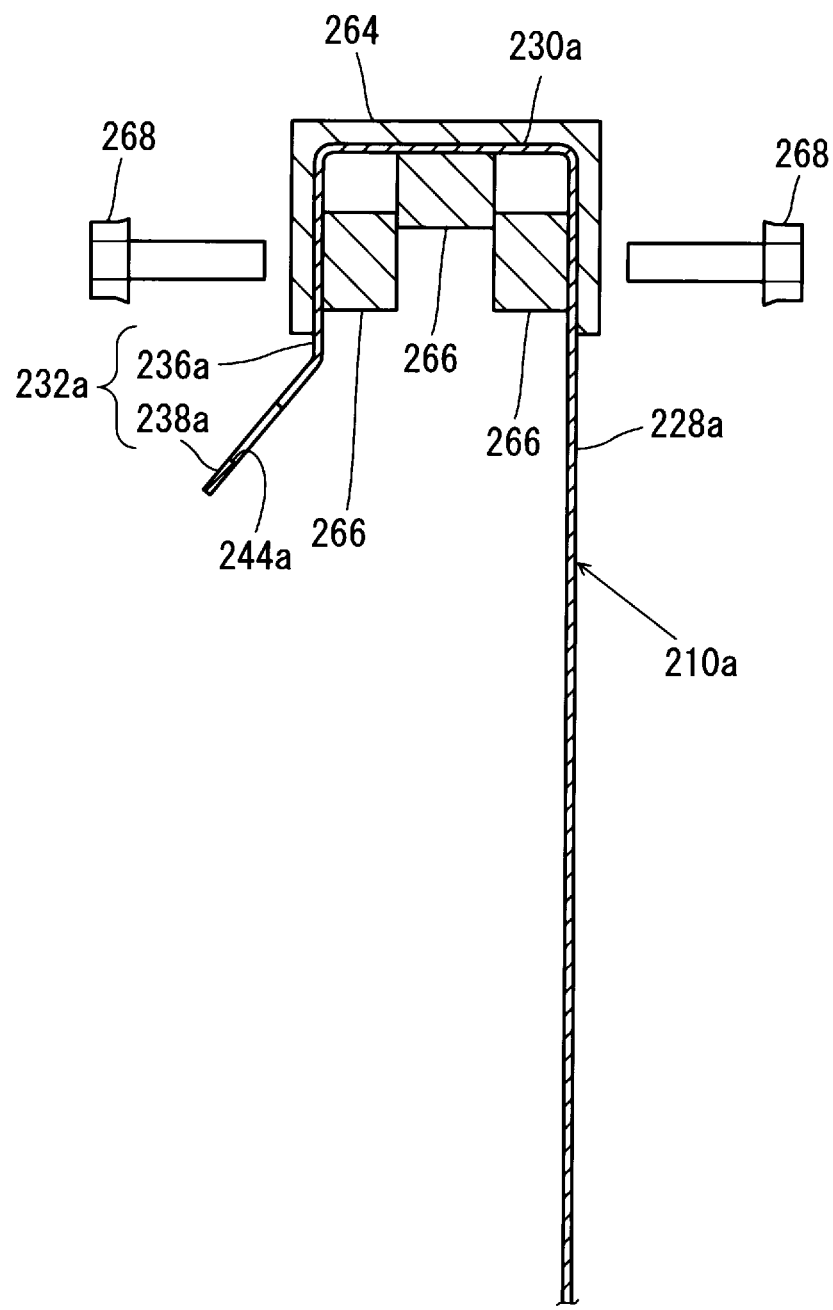
FIG. 26 is a sectional illustrative view to show an example state in which an attachment is attached to the side wall portion.

Referring to FIG. 26, at the side wall portion 210a of the cargo bed 24, an attachment 264, for example, is attached. The attachment 264 is a mounting bracket having a U-shaped or substantially U-shaped section. In this case, the main side wall 228a of the side wall portion 210a, the first flange portion 230a, and the first region 236a of the second flange portion 232a have their respective inner surfaces provided with nuts 266 welded thereto. Under this state, the attachment 264 is placed on the side wall portion 210a from above and then, bolts 268 are threaded into the welded nuts 266 from both inner and outer sides of the side wall portion 210a to hold the attachment 264 and the side wall portion 210a in a pincer-like fashion. Thus, the attachment 264 is fixed to the side wall portion 210a, i.e., to the cargo bed 24. The attachment 264 can also be attached to the side wall portion 210b in the same way.

Once the attachment 264 has been fixed to the cargo bed 24, then it is possible to attach anything onto an upper surface of the attachment 264. Specifically, any member which is desired to be attached should be provided with a bolt, and this bolt is threaded from the upper surface of the attachment 264 into the welded nut 266 welded onto the lower surface of the first flange portion 230a. In this way, any member which is desired to be attached can be fixed to the upper surface of the attachment 264.

According to the cargo bed 24 as described thus far, the second flange portion 232a extends downward from the outer edge of the first flange portion 230a, and the lower edge 231c of the second flange portion 232a is covered by the rear fender 202a. This prevents a gap from being formed between the side wall portion 210a (more specifically, the lower edge 231c of the second flange portion 232a) and the rear fender 202a. Therefore, it is possible to prevent muddy water, etc., splashed by the rear wheel 14 of the vehicle 10 from finding a way to come out from between the main body portion 200 and the rear fender 202a. As a result, it is possible to significantly reduce or prevent dirtiness on outer surfaces of the rear fender 202a.

By exposing the first flange portion 230a, the arrangement makes it possible to fix the attachment 264 directly to the first flange portion 230a.

By exposing the second flange portion 232a, the arrangement makes it possible to fix the attachment 264 directly also to the second flange portion 232a. This improves versatility of the cargo bed 24.

The second flange portion 232a includes the second region 238a which extends obliquely downward from a lower edge of the first region 236a, so that it becomes possible to improve stiffness of the second flange portion 232a. Since the second region 238a is slanted obliquely downward, formation of the holes 244a in the second region 238a for the fasteners 240 can be performed by using a landed plunger mold, for example. In other words, a simple mold can be used to form the holes 244a in the second region 238a.

Since the outer surface of the second region 238a faces obliquely upward, it is easy to attach fasteners 240 for fixing the rear fender 202a to the second region 238a. Also, the first region 236a of the second flange portion 232a can be used to fix the attachment 264, in addition to the first flange portion 230a. This improves versatility of the cargo bed 24.

Figure 27:
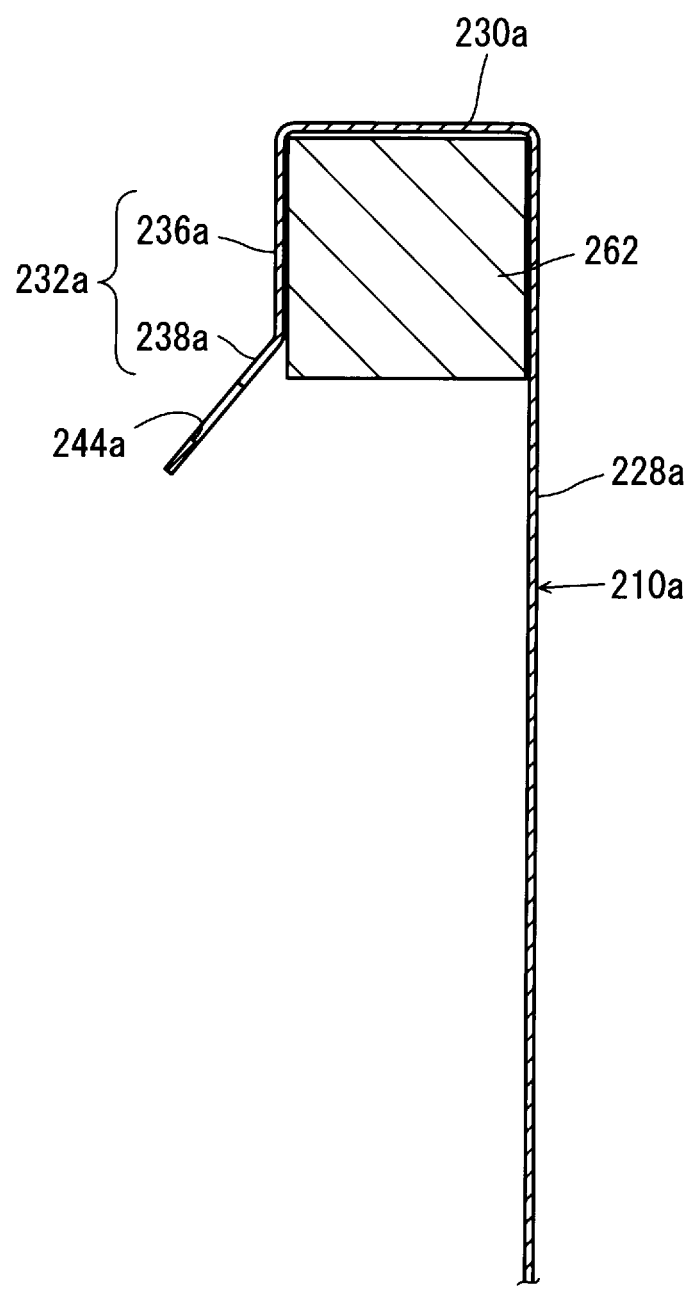
FIG. 27 is a sectional view showing a state where a square timber is placed between the main side wall and a first region in the side wall portion.
Figure 28:
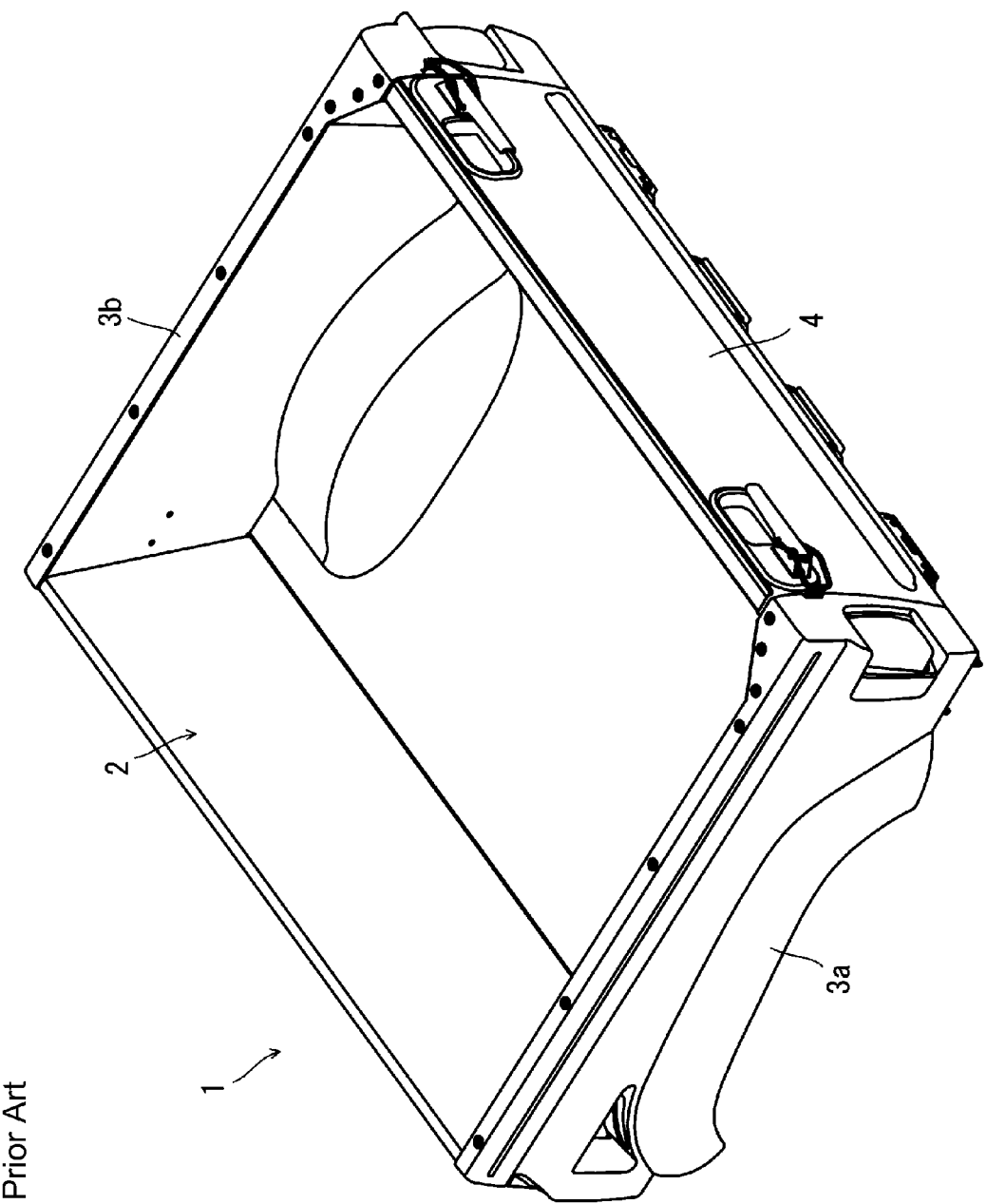
FIG. 28 is a perspective view of a conventional cargo bed from an above and rear view point.
Figure 29:
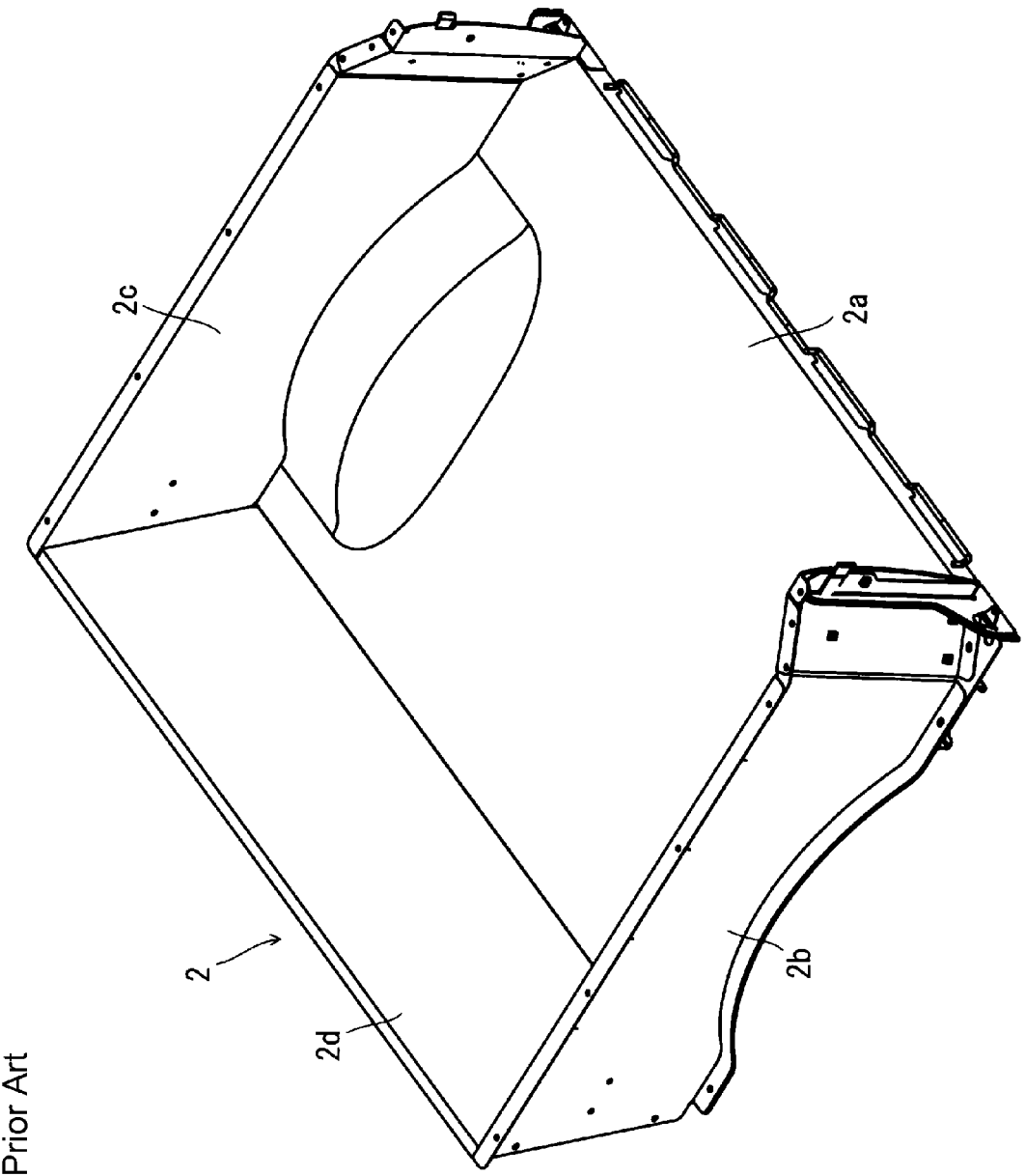
FIG. 29 is a perspective view of a main body portion of the cargo bed from a rear and above view point.
Figure 30:
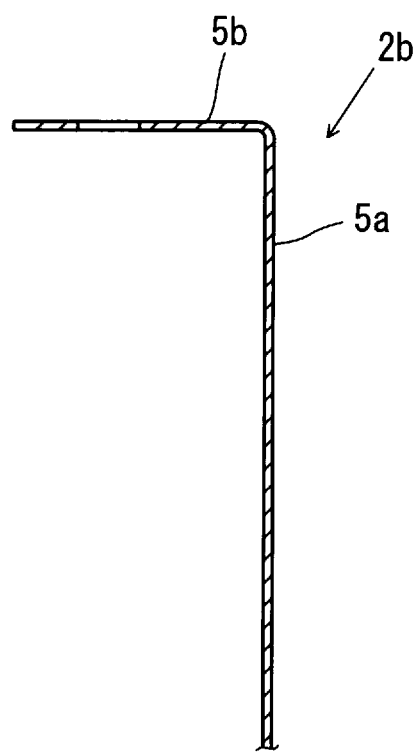
FIG. 30 is a sectional view showing an upper end region of a side wall portion.
Figure 31:
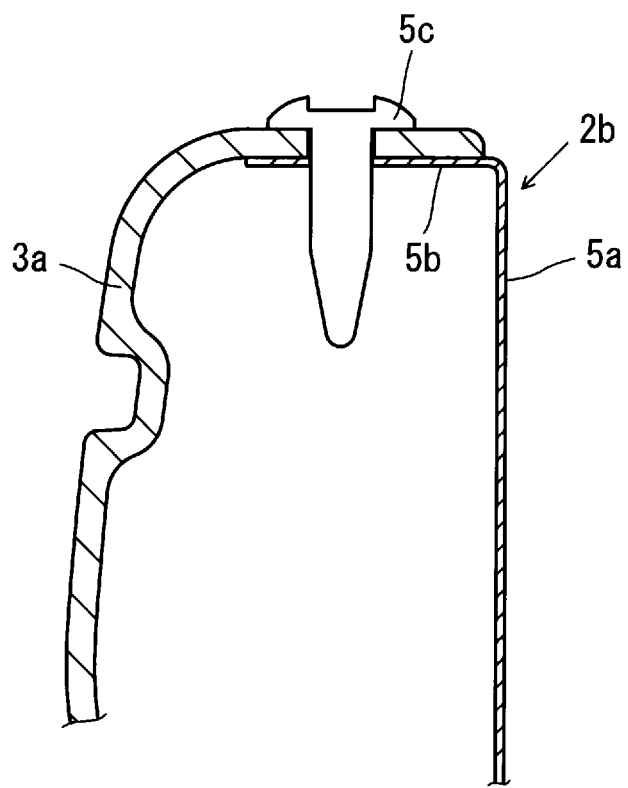
FIG. 31 is a sectional view showing the upper end region of the side wall portion and an upper end region of a rear fender.
Figure 32:
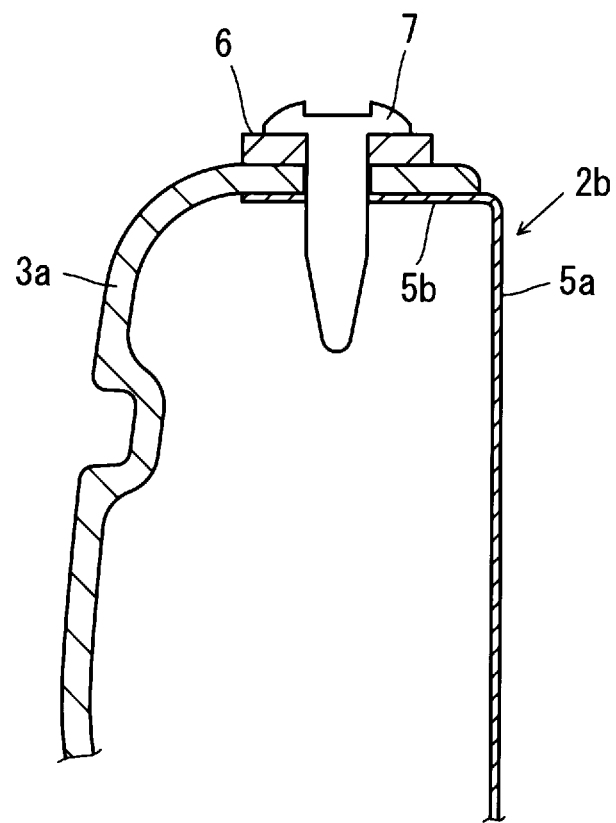
FIG. 32 is a sectional illustrative view to show an example state in which an attachment is attached to the conventional cargo bed.
Figure 33:
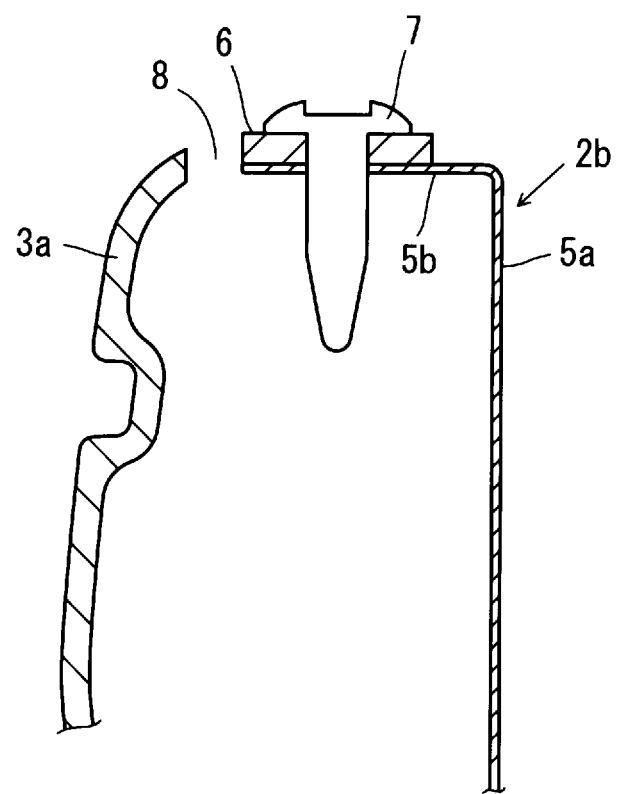
FIG. 33 is a sectional illustrative view to show another example state in which an attachment is attached to the conventional cargo bed.

Referring to FIG. 27, in the side wall portion 210a of the cargo bed 24 as described thus far, a one-inch square piece of wood 262, which is easily available in the United States of America, can be fitted between the main side wall 228a and the first region 236a of the second flange portion 232a. This provides easy improvement of the stiffness of the side wall portion 210a.

The rear fender 202a covers the forward end region 231a and the rearward end region 231b of the first flange portion 230a, and the forward end region 231d and the rearward end region 231e of the second flange portion 232a, thus making it possible to protect the forward end region 231a and the rearward end region 231b of the first flange portion 230a, and the forward end region 231d and the rearward end region 231e of the second flange portion 232a with the rear fender 202a.

The rear fender 202b and the side wall portion 210b also provide the same advantages.

It should be noted here that the rear fenders may cover the entire upper surface of the first flange portion 230a (230b), for example. In this case, a portion of the rear fender will be cut out to expose the first flange portion 230a (230b), so that an attachment can be fixed directly to the exposed region of the first flange portion 230a (230b). This makes it possible to fix the attachment strongly to the cargo bed 24. In cases where the rear fender is made to cover the entire upper surface of the first flange portion 230a (230b), the rear fender may include a perforation or perforations, for example, for cutting out a predetermined region.

Also, the rear fender may cover the entire upper surface of the second flange portion 232a (232b). In this case, a portion of the rear fender will be cut out to expose the second flange portion 232a (232b), so that an attachment can be fixed directly to the exposed region of the second flange portion 232a (232b).

The attachment to be attached to the cargo bed 24 is not limited to the attachment 264 described above. Rather, various attachments can be used.

In the preferred embodiment described above, description was made for a case where the vehicle 10 includes a pair of rear wheels 14, for example. However, the vehicle may have two or more pairs of rear wheels.

In the preferred embodiment described above, description was made for a case where the cargo bed 24 preferably is supported pivotably by the frame portion 16, for example. However, the cargo bed may be fixed to the frame portion.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A cargo bed comprising:
a main body portion made of a material including a metal; and
a pair of rear fenders made of a material including a resin and fixed to the main body portion; wherein
the main body portion includes:
a front wall portion extending in an up-down direction and a left-right direction;
a bottom portion extending rearward from a lower edge region of the front wall portion; and
a pair of side wall portions extending upward from two edge regions in the left-right direction, of the bottom portion, and connected to two edge regions in the left-right direction, of the front wall portion;
the pair of rear fenders are fixed to the pair of side wall portions, respectively;
each of the pair of side wall portions includes:
a main side wall extending upward from the bottom portion;
a first flange portion extending in the left-right direction, from an upper edge of the main side wall to an outside of the main body portion; and
a second flange portion extending downward from an outside edge of the first flange portion; and
each of the pair of rear fenders covers at least an entire lower edge of the second flange portion; and
each of the pair of rear fenders is fixed to the second flange portion with a fastener.

2. The cargo bed according to claim 1, wherein each of the pair of rear fenders fixed to the side wall portion makes at least a portion of the first flange portion exposable.

3. The cargo bed according to claim 1, wherein each of the pair of rear fenders exposes at least a portion of the second flange portion.

4. A cargo bed comprising:
a main body portion made of a material including a metal; and
a pair of rear fenders made of a material including a resin and fixed to the main body portion; wherein
the main body portion includes:
a front wall portion extending in an up-down direction and a left-right direction;
a bottom portion extending rearward from a lower edge region of the front wall portion; and
a pair of side wall portions extending upward from two edge regions in the left-right direction, of the bottom portion, and connected to two edge regions in the left-right direction, of the front wall portion;
the pair of rear fenders are fixed to the pair of side wall portions, respectively;
each of the pair of side wall portions includes:
a main side wall extending upward from the bottom portion;
a first flange portion extending in the left-right direction, from an upper edge of the main side wall to an outside of the main body portion; and
a second flange portion extending downward from an outside edge of the first flange portion; and
each of the pair of rear fenders covers at least an entire lower edge of the second flange portion; and
each second flange portion includes a first region extending downward from an outer edge of the first flange portion and a second region extending obliquely downward from a lower edge of the first region toward an outside of the main body portion in the left-right direction.

5. The cargo bed according to claim 4, wherein each of the pair of rear fenders is fixed to the second region.

6. The cargo bed according to claim 1, wherein the main side wall and the second flange portion are spaced by a gap of approximately one inch.

7. A cargo bed comprising:
a main body portion made of a material including a metal; and
a pair of rear fenders made of a material including a resin and fixed to the main body portion; wherein
the main body portion includes:
a front wall portion extending in an up-down direction and a left-right direction;
a bottom portion extending rearward from a lower edge region of the front wall portion; and
a pair of side wall portions extending upward from two edge regions in the left-right direction, of the bottom portion, and connected to two edge regions in the left-right direction, of the front wall portion;

the pair of rear fenders are fixed to the pair of side wall portions, respectively;

each of the pair of side wall portions includes:
- a main side wall extending upward from the bottom portion;
- a first flange portion extending in the left-right direction, from an upper edge of the main side wall to an outside of the main body portion; and
- a second flange portion extending downward from an outside edge of the first flange portion; and
- each of the pair of rear fenders covers at least an entire lower edge of the second flange portion;

each of the pair of rear fenders covers a forward end region of the first flange portion, a rearward end region of the first flange portion, a forward end region of the second flange portion, and a rearward end region of the second flange portion; and an intermediate region of the first flange portion between the forward end region and the rearward end region is exposed.

8. A vehicle in combination with the cargo bed according to claim 1.

9. The cargo bed according to claim 1, wherein an overlapping portion of each of the pair of rear fenders overlaps with an overlapping portion of the second flange portion, and the fastener extends through a hole in the overlapping portion of each of the pair of rear fenders and a hole in the overlapping portion of the second flange portion to fix each of the pair of rear fenders to the second flange portion.

10. The cargo bed according to claim 1, wherein the fastener extends from an outside of each of the pair of rear fenders through a hole in each of the pair of rear fenders and a hole in the second flange portion to fix each of the pair of rear fenders to the second flange portion.

* * * * *